US007236619B2

(12) United States Patent
Doi et al.

(10) Patent No.: US 7,236,619 B2
(45) Date of Patent: Jun. 26, 2007

(54) SYSTEM AND METHOD FOR COMPUTER-AIDED DETECTION AND CHARACTERIZATION OF DIFFUSE LUNG DISEASE

(75) Inventors: Kunio Doi, Willowbrook, IL (US); Yoshikazu Uchiyama, Suzuka (JP); Shigehiko Katsuragawa, Oita (JP)

(73) Assignee: University of Chicago, Chicago, IL (US)

( * ) Notice: Subject to any disclaimer, the term of this patent is extended or adjusted under 35 U.S.C. 154(b) by 855 days.

(21) Appl. No.: 10/357,442

(22) Filed: Feb. 4, 2003

(65) Prior Publication Data
US 2004/0086162 A1    May 6, 2004

Related U.S. Application Data

(60) Provisional application No. 60/422,473, filed on Oct. 31, 2002.

(51) Int. Cl.
*G06K 9/00* (2006.01)
(52) U.S. Cl. .................................. 382/128
(58) Field of Classification Search .......... 382/128, 382/132, 131
See application file for complete search history.

(56) References Cited

U.S. PATENT DOCUMENTS 5,343,390 A * 8/1994 Doi et al. ............. 382/132
5,873,824 A * 2/1999 Doi et al. ............. 600/408
6,549,646 B1 * 4/2003 Yeh et al. ............. 382/132
6,760,468 B1 * 7/2004 Yeh et al. ............. 382/132

OTHER PUBLICATIONS

Renuka Uppaluri, et al. "Computer Recognition of Regional Lung disease Patterns", Am J Respir Crit Care Med vol. 160, pp. 648-654, (Received in original form Apr. 16, 1998 and in revised form Jan. 20, 1999).
K. R. Heitmann et al. "Automatic detection of ground glass opacities on lung HRCT using multiple neural networks", European Radiology 7, pp. 1463-1472 (1997).

* cited by examiner

*Primary Examiner*—Matthew C. Bella
*Assistant Examiner*—Tom Y. Lu
(74) *Attorney, Agent, or Firm*—Oblon, Spivak, McClelland, Maier & Neustadt, P.C.

(57) ABSTRACT

An automated computerized scheme for detection and characterization of diffuse lung diseases on high-resolution computed tomography (HRCT) images including obtaining image data including pixels of an organ; segmenting the image data into organ image data and non-organ image data; extracting predetermined features from the organ image data to produce a set of image features; comparing the set of image features against a reference set of organ image features containing image data known to correspond to normal and abnormal conditions; and producing a comparison result.

29 Claims, 21 Drawing Sheets

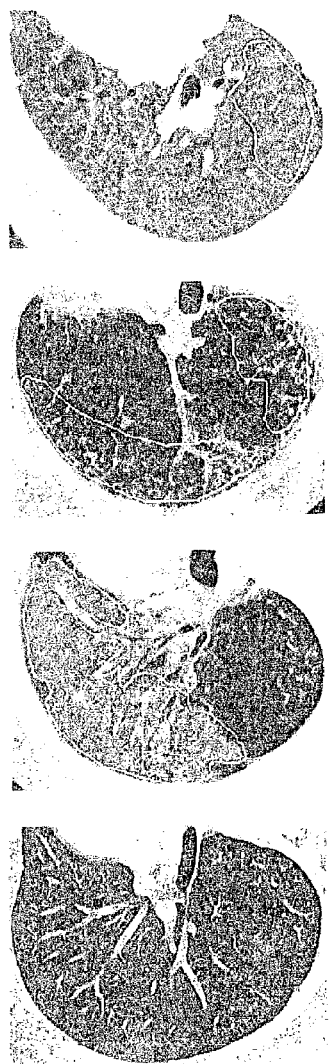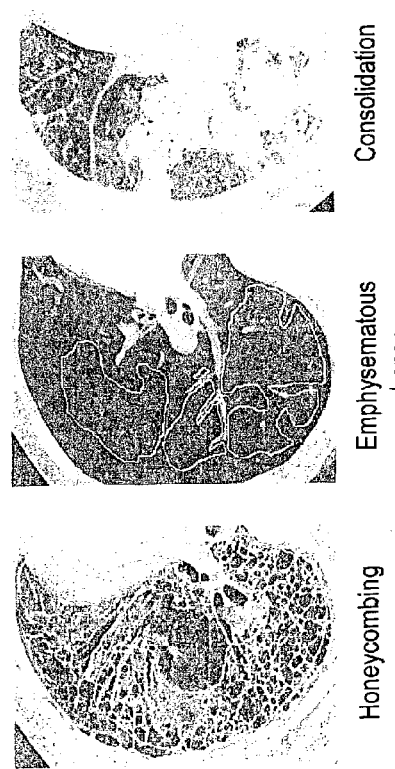
FIG. 1A Normal
FIG. 1B Ground-glass opacities
FIG. 1C Reticular and linear opacities
FIG. 1D Nodular opacities
FIG. 1E Honeycombing
FIG. 1F Emphysematous change
FIG. 1G Consolidation

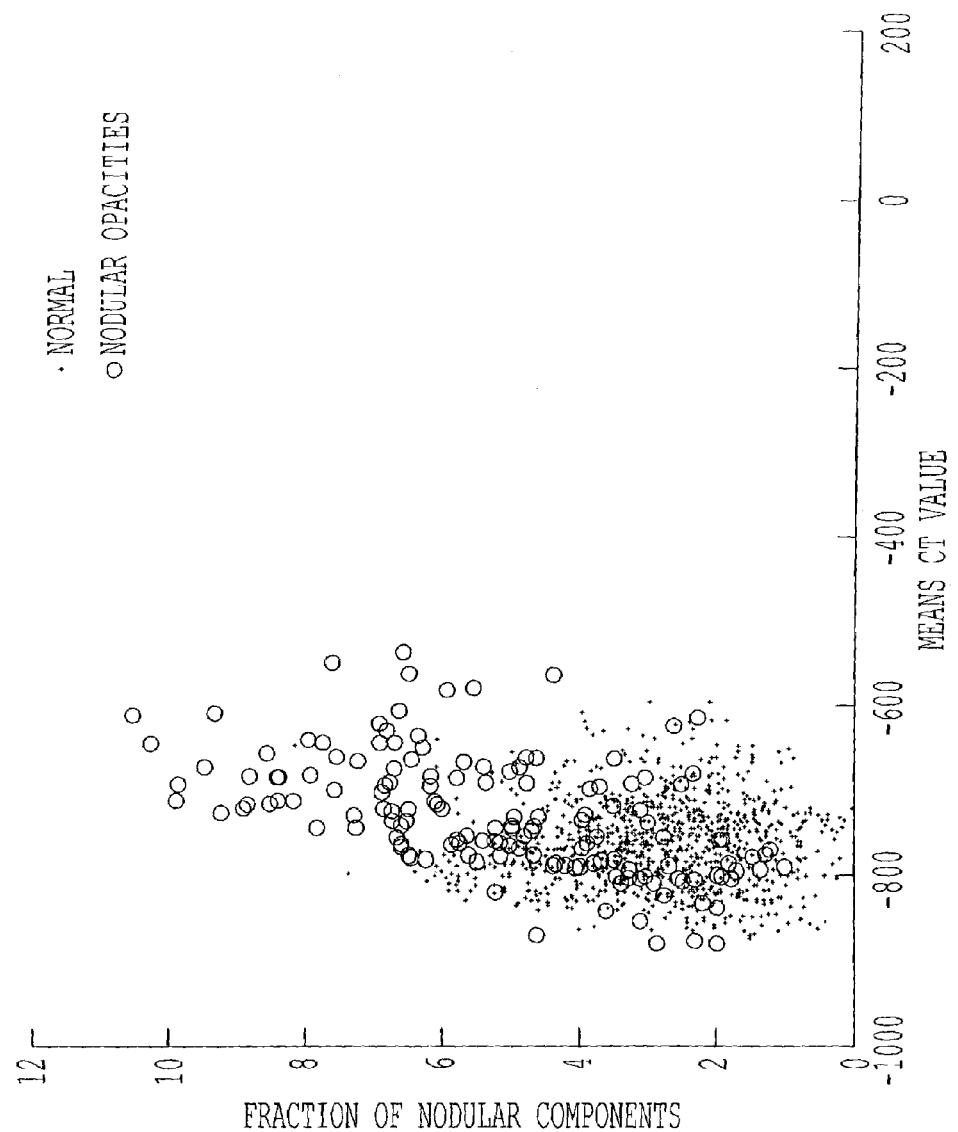

|  | | COMPUTER OUTPUT | | | | | |
|---|---|---|---|---|---|---|---|
|  | | NORMALS | GGO | RETICULAR | NODULAR | HONEYCOMBING | EMPHYSEMA | CONSOLIDATION |
| "GOLD STANDARD" | NORMALS (1045) | 940 (88.1%) | 17 (1.6%) | 14 (1.3%) | 72 (6.7%) | 6 (0.6%) | 18 (1.7%) | 0 (0.0%) |
| | GGO (123) | 1 (0.8%) | 122 (99.2%) | 0 (0.0%) | 0 (0.0%) | 0 (0.0%) | 0 (0.0%) | 0 (0.0%) |
| | RETICULAR (15) | 0 (0.0%) | 0 (0.0%) | 15 (100%) | 0 (0.0%) | 0 (0.0%) | 0 (0.0%) | 0 (0.0%) |
| | NODULAR (150) | 10 (6.7%) | 0 (0.0%) | 1 (0.7%) | 132 (88.0%) | 0 (0.0%) | 7 (4.7%) | 0 (0.0%) |
| | HONEYCOMBING (98) | 0 (0.0%) | 0 (0.0%) | 0 (0.0%) | 0 (0.0%) | 98 (100%) | 0 (0.0%) | 0 (0.0%) |
| | EMPHYSEMA (385) | 10 (2.6%) | 2 (0.5%) | 2 (0.5%) | 0 (0.0%) | 1 (0.3%) | 369 (95.8%) | 1 (0.3%) |
| | CONSOLIDATION (43) | 0 (0.0%) | 0 (0.0%) | 0 (0.0%) | 0 (0.0%) | 0 (0.0%) | 0 (0.0%) | 43 (100%) |

FIG. 12

SYSTEM AND METHOD FOR COMPUTER-AIDED DETECTION AND CHARACTERIZATION OF DIFFUSE LUNG DISEASE

The present invention was made in part with U.S. Government support under USPHS grants CA62625. The U.S. Government may have certain rights to this invention.

BACKGROUND OF THE INVENTION

FIELD OF THE INVENTION

This invention relates to an automated computerized scheme for detection and characterization of diffuse lung diseases.

The present invention also generally relates to computerized techniques for automated analysis of digital images, for example, as disclosed in one or more of U.S. Pat. Nos. 4,839,807; 4,841,555; 4,851,984; 4,875,165; 4,907,156; 4,918,534; 5,072,384; 5,133,020; 5,150,292; 5,224,177; 5,289,374; 5,319,549; 5,343,390; 5,359,513; 5,452,367; 5,463,548; 5,491,627; 5,537,485; 5,598,481; 5,622,171; 5,638,458; 5,657,362; 5,666,434; 5,673,332; 5,668,888; 5,732,697; 5,740,268; 5,790,690; 5,832,103; 5,873,824; 5,881,124; 5,931,780; 5,974,165; 5,982,915; 5,984,870; 5,987,345; 6,011,862; 6,058,322; 6,067,373; 6,075,878; 6,078,680; 6,088,473; 6,112,112; 6,138,045; 6,141,437; 6,185,320; 6,205,348; 6,240,201; 6,282,305; 6,282,307; 6,317,617; 6,335,980; 6,363,163; 6,442,287; 6,470,092 as well as U.S. patent application Ser. Nos. 08/173,935; 08/398,307 (PCT Publication WO 96/27846); Ser. Nos. 08/536,149; 08/900,189; 09/692,218; 09/759,333; 09/760,854; 09/773,636; 09/816,217; 09/830,562; 09/818,831; 09/842,860; 09/830,574; 09/842,860; 09/881,002; 09/990,310; 09/990,311; 09/990,377; 10/036,541; 10/078,694; 10/097,820; 10/097,727; 10/120,420; 10/126,523; 10/198,141; 10/223,442; 10/231,064; 10/270,674; 60/160,790; 60/176,304; 60/329,322; 60/331,995; 60/332,005; 60/354,523 and 60/395,305; and PCT patent applications PCT/US98/15165; PCT/US98/24933; PCT/US99/03287; PCT/US00/41299; PCT/US01/00680; PCT/US01/01478; PCT/US01/01479; PCT/US01/08626; PCT/US01/43146; PCT/US02/06638; PCT/US02/16018; and PCT/US02/31578; and U.S. patent application Ser. No. 10/355,147, now U.S. Pat. No. 6,937,776 all of which are incorporated herein by reference.

The present invention includes use of various technologies referenced and described in the above-noted U.S. Patents and Applications, as well as described in the references identified in the following LIST OF REFERENCES. Author(s) and year of publication are cross referenced throughout the specification by reference to the respective number, in parenthesis, of the reference:

LIST OF REFERENCES

[1] S. Katsuragawa, K. Doi, and H. MacMahon, "Image feature analysis and computer-aided diagnosis in digital radiography: Detection and characterization of interstitial lung disease in digital chest radiographs," Med. Phys. 15, 311-319 (1988).

[2] S. Katsuragawa, K. Doi, and H. MacMahon, "Image feature analysis and computer-aided diagnosis in digital radiography: Classification of normal and abnormal lung with interstitial disease in chest images," Med. Phys. 16, 38-44 (1989).

[3] S. Katsuragawa et al., "Image feature analysis and computer-aided diagnosis in digital radiography: Effect of digital parameters on the accuracy of computerized analysis of interstitial disease in digital chest radiographs," Med. Phys. 17, 72-78 (1990).

[4] T. Ishida et al., "Computerized analysis of interstitial disease in chest radiographs: Improvement of geometric-pattern feature analysis," Med. Phys. 24, 915-924 (1997).

[5] T. Ishida et al., "Application of artificial neural networks for quantitative analysis of image data in chest radiographs for detection of interstitial lung disease," J. of Digital Imaging, 11, 182-192 (1998).

[6] L. Monnier-Cholley et al., "Computer aided diagnosis for detection of interstitial infiltrates in chest radiographs: Evaluation by means of ROC analysis", Am J Radiol 171, 1651-1656 (1998).

[7] K. Ashizawa et al., "Artificial neural networks in chest radiographs: Application to differential diagnosis of interstitial lung disease," Acad. Radiol. 6, 2-9 (1999).

[8] K. Ashizawa et al., "Effect of artificial networks on radiologists' performance for differential diagnosis of interstitial lung disease on chest radiographs," Am. J. Radiol. 172, 1311-1315 (1999).

[9] K. R. Heitmann et al., "Automatic detection of ground glass opacities on lung HRCT using multiple neural networks", Eur. Radiol. 7, 1463-1472 (1997).

[10] R. Uppaluri et al., "Computer recognition of regional lung disease patterns", Am J Respir Crit Care Med, 160, 648-654 (1999).

[11] S. Delorme et al., "Usual interstitial pneumonia: quantitative assessment of high-resolution computed tomogaphy findings by computer-assisted texture-based image analysis", Investigative Radiology, 32, 566-574 (1997).

[12] J. Serra, "Image analysis and mathematical morphology", Academic Press, London, (1982).

[13] R. C. Gonzalez and R. E. Woods, "Digital Image Processing", Addison-Wesley, MA, 518-560 (1992).

[14] D. E. Rumelhart, G. E. Hinton, and R. J. Williams, "Learning internal representations by error propagation", Vol. 1: Parallel Distribution Processing, chapter 8, 318-362, MIT Press, MA (1986).

[15] S. Haykin, "Neural Networks: A Comprehensive Foundation", Prentice Hall, N.J., 156-251 (1999).

[16] R. O. Duda, et al., "Pattern Classification", John Wiley & Sons, NY, 20-64 (2001).

[17] K. Fukunaga, "Statistical Pattern Recognition", Academic Press, CA, 124-177 (1990).

DISCUSSION OF THE BACKGROUND

For computerized detection of interstitial lung diseases on chest radiographs, the present inventors previously developed three different CAD schemes which were based on the Fourier transform [23], a geometric-pattern feature analysis, [4] and an artificial neural network (ANN) analysis [5] of image data. The results of an observer performance study [6] indicated that radiologists' performance in distinguishing between normal lungs and abnormal lungs with interstitial infiltrates was improved when the computer results were available.

Subsequent to detection is the task of differential diagnosis for identification of interstitial disease among many possible diseases. The present inventors also have previously developed an ANN scheme for determination of the likelihood of each of 11 interstitial diseases by using 10 clinical parameters and 16 radiologic findings. [7] Experimental results obtained with receiver operating characteristic (ROC) analysis indicated that radiologists' performance in differential diagnosis was improved significantly when they used the computer output. [8]

In previous studies for detection of diffuse lung diseases on high resolution computed tomography (HRCT) images, Heitmann et al. [9] developed a method for automated detection of ground-glass opacities on 120 HRCT images from 20 patients by using a hybrid network of three single networks with an expert rule. This hybrid network correctly classified 91 (75.8%) of 120 images from 20 patients.

Uppaluri et al. [10] developed an adaptive multiple feature method in assessing 22 independent texture features in order to classify six tissue patterns: honeycombing, ground glass, broncho-vascular, nodular, emphysema-like, and normal patterns. Delorme et al. [11] developed a texture-based pattern recognition method to classify normal patterns, emphysematous changes, ground-glass lesion, intra-lobular fibrosis, and vessels by use of a multivariable discrimination analysis. Delorme et al. reported that 1,336 (70.7%) of 1,889 regions of interest (ROIs) with 5×5 matrix size obtained from five patients were classified correctly. These studies indicated that some diffuse lung diseases on HRCT can be detected by use of the computerized scheme. However, the number of cases used was relatively small, and the level of performance was rather low for clinical applications.

As evidenced by these and other studies, differential diagnosis of diffuse lung disease is a major subject in high-resolution computed tomography (HRCT). However, it is considered a difficult task for radiologists, partly because of the complexity and variation in diffuse disease patterns on HRCT images, and also because of the subjective terms used for describing diffuse lung diseases. What is required to address the above-described limitations, as discovered by the present inventors, is a tool for computer-aided diagnosis of diffuse lung diseases via HRCT.

SUMMARY OF THE INVENTION

One object of the present invention is to provide a novel method, system, and computer program product for computer-aided diagnosis of diffuse lung diseases via HRCT in order to assist radiologists' image interpretations. Thus, the present invention is directed to automated computerized detection and characterization of diffuse lung diseases on high-resolution computed tomography (HRCT) images including obtaining image slice data including pixels of an organ; segmenting the image slice data into organ image slice data and non-organ image slice data; extracting predetermined features from the organ image slice data to produce a set of image features; comparing the set of image features against a reference set of organ image features containing image data known to correspond to normal and abnormal conditions; and producing a comparison result. The method is predicated on training a decision aid system with images of one or more known normal slices and a predetermined number (e.g., six) abnormal image slices, each corresponding to different opacity patterns (e.g., ground-glass opacities, reticular and linear opacities, nodular opacities, honeycombing, emphysematous change, and consolidation). Predetermined physical measures are determined in each ROI (e.g., the mean and the standard deviation of the CT value, air density components, nodular components, line components, and multi-locular components). Artificial neural networks (ANNs) are employed for distinguishing between the seven different patterns.

BRIEF DESCRIPTION OF THE DRAWINGS

A more complete appreciation of the present invention and many of the attendant advantages thereof will be readily obtained as the same becomes better understood by reference to the following detailed descriptions and accompanying drawings:

FIG. 1 is an illustration of HRCT images with (a) normal slice and abnormal slices with (b) ground-glass opacities, (c) reticular and linear opacities, (d) nodular opacities, (e) honeycombing, (f) emphysematous change, and (g) consolidation;

FIGS. 8a-8e are scatter-grams of the physical measures for all ROIs selected from a reference set of images;

FIG. 12 is a table of computerized classification results of the ROIs obtained from the reference set, based on the use of the ANN and twelve input features;

DETAILED DESCRIPTION OF THE PREFERRED EMBODIMENTS

Figure 2:
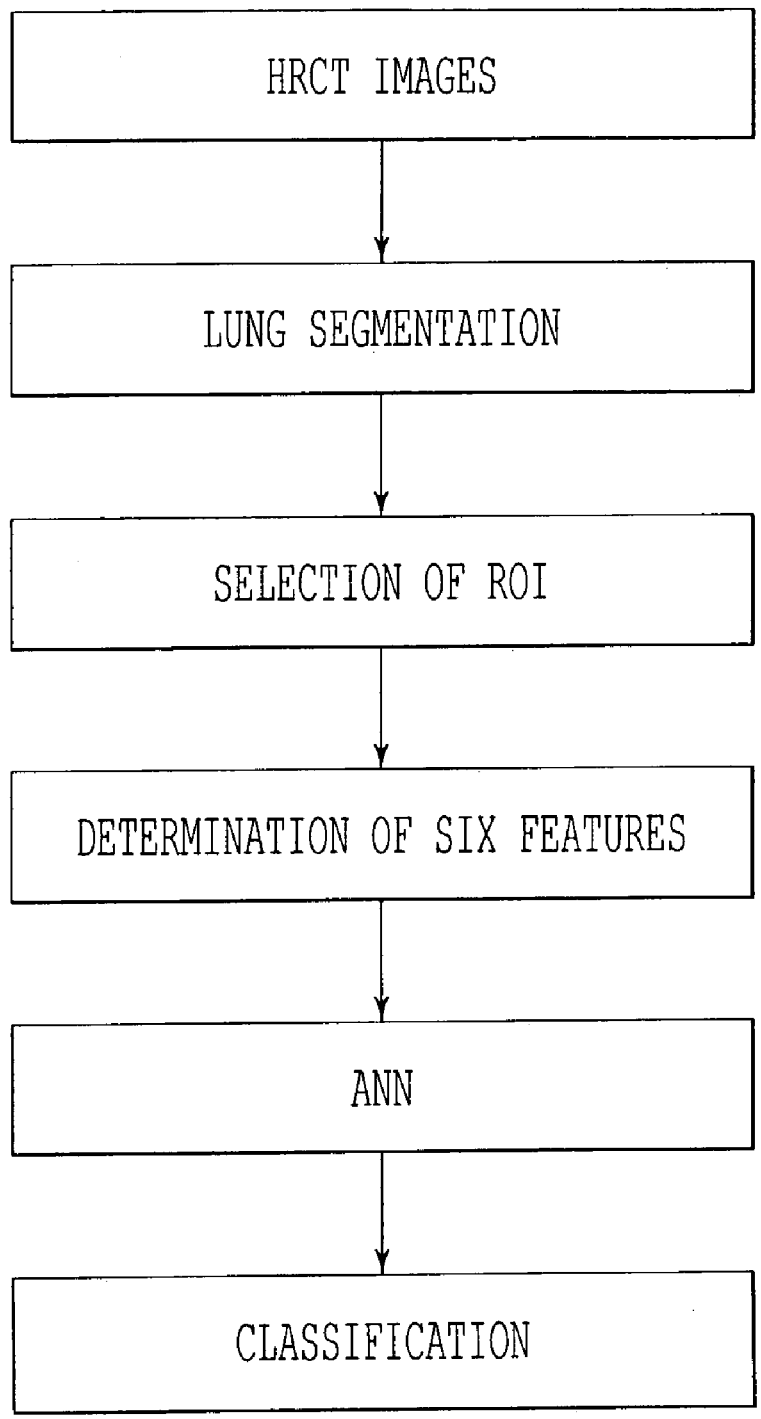
FIG. 2 is a flow chart of computerized classification method of one embodiment of the present invention using an ANN.

The present invention uses typical normal and abnormal images as a reference set for diagnostic analysis. The reference set is used because the subjective terms and judgments by radiologists have generally been used to describe diffuse lung diseases. Thus, as prelude to the method of the present invention, an image database of images normal and abnormal cases reported in clinical examinations over a predetermined period of time is examined and representative images are selected as for creation of the reference set. Specific image areas in each image of the selected images are associated with known, specific abnormal patterns and are excerpted and/or otherwise included in the reference set.

This reference set can be created by chest radiologists independently marking on the reference images areas that are known to include specific diffuse patterns and other abnormalities. This marking may be performed on a CRT monitor and via a mouse. In this way, the chest radiologists may mark abnormal areas in the same manner as they commonly describe in their radiologic reports. Therefore, areas with very subtle and suspicious abnormal opacities, which might be considered unimportant clinically by the radiologists, may be excluded from the reference set that is used elsewhere in the present invention. Diffuse abnormal patterns may be marked as: (1) ground-glass opacities, (2) reticular and linear opacities, (3) nodular opacities, (4) honeycombing, (5) emphysematous change, (6) consolidation, (7) non-specific diffuse opacities or indeterminate for classification, and (8) other abnormalities such as atelectasis, pleural thickening, bronchectasis, pleural effusion, bulla, focal lung lesion, and artifacts.

Preferably, each abnormal pattern is identified and characterized independently. Also, areas that include two or more different patterns are preferably marked with different colors. The areas with a specific pattern which the radiologists independently and consistently marked as the same pattern are included in the reference set for the specific abnormal opacities. Areas identified by the radiologists as abnormal, even if they are identified with different abnormal patterns in the same area, may be judged as "abnormal areas" and may be included in the reference set. A slice is determined to be an "abnormal slice" when there is at least one "abnormal area," whereas a slice is determined to be a "normal slice" when there is no area identified by any of the radiologists as abnormal. Areas obtained from a "normal slice" are determined to be "normal areas."

FIG. 1 shows portions of enlarged HRCT images of one normal slice and six abnormal slices corresponding to six opacity types: ground-glass opacities, reticular and linear opacities, nodular opacities, honeycombing, emphysematous change, and consolidation. The white lines indicate the abnormal area of the reference set of images for each of the specific opacities. HRCT images similar to these may be employed in the present invention to improve the detection and classification of abnormal areas associated with diffuse lung disease.

FIG. 2 is a flow chart of the method of diffuse lung disease detection and classification of the present invention. Lungs in HRCT images are first segmented from background in each slice by using a gray-level morphological opening and a thresholding technique. A gray-level morphological opening [2,13] is applied to remove small light structures such as blood vessels while maintaining overall gray levels and larger light structures. A gray-level histogram indicating the distribution [7] of pixel values is then constructed from pixels within the smoothed thorax. A gray level that maximizes the separation between the two main peaks of the histogram is used as a threshold to segment the lungs. A majority of the lungs in HRCT images may be segmented by this automated method. However, because some lungs with consolidation may not be segmented correctly, it is possible to supplement the automated method with a manual method for segmentation of the lung regions.

Many contiguous ROIs are automatically selected over the segmented lung region. Preferably this selection is made with a 32×32 pixel (or 16×16 mm) matrix. For abnormal ROIs used in the reference set at least 50% of the area in a ROI should include specific abnormal opacities identified by the radiologists. A larger ROI matrix size (e.g., 96×96 pixel or 48×48 mm matrix) may also be used. This larger ROI matrix is preferably centered over the smaller (e.g., 32×32 pixel or 16×16 mm matrix) ROI. In one embodiment, one large ROI may include nine contiguous small ROIs, with two adjacent large ROIs overlapping considerably. When some areas outside the lung regions are included in an ROI, the corresponding outside area is not considered when evaluating diffuse lung disease. The physical measures determined in each ROI are used as the input data to an ANN.

The ANN is employed to distinguish between a predetermined set of different patterns. In one embodiment, the predetermined set of patterns included one normal pattern and six different patterns associated with diffuse lung disease (e.g., ground-glass opacities, reticular and linear opacities, nodular opacities, honeycombing, emphysematous change, and consolidation.)

In another embodiment, a Bayesian classifier may be used either with or as an alternative to the ANN.

In another embodiment, the physical measures associated with the patterns include up to three measures related to the gray-level distribution and up to three measures related to geometric patterns.

The gray-level distribution measures are the mean and the standard deviation of CT values in an ROI, and also the fraction of the area with air density components in an ROI.

Figure 3:
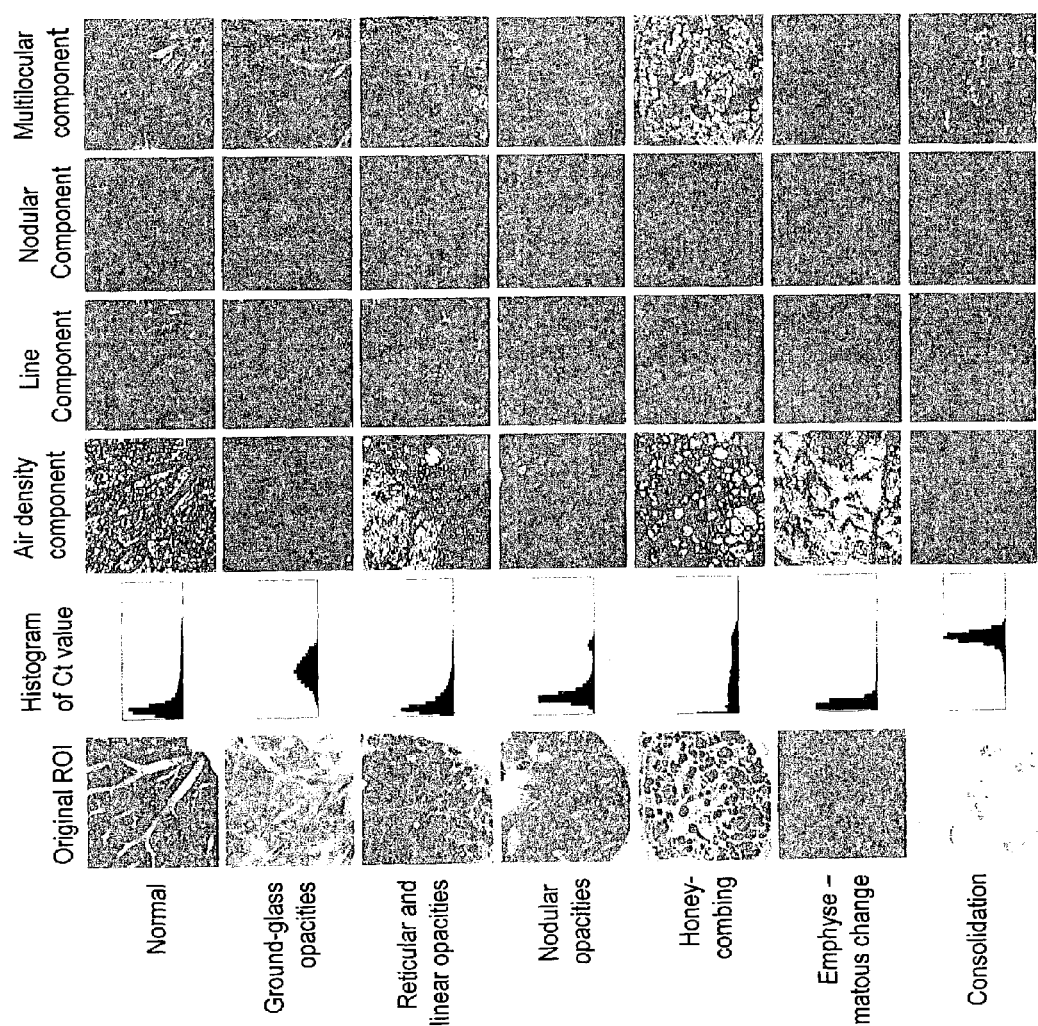
FIG. 3 is an illustration of 96×96 images selected from the seven slices in FIG. 1 as well as histograms of ROI images and output images for air density components, line components, nodular components, and multi-locular components.

The air density component is defined by the area having CT values between −910 HU and −1000 HU. The mean of CT values is employed to distinguish opacities which include very light areas or very dark areas in HRCT images such as consolidation and emphysematous change, as shown in FIG. 3.

The standard deviation of CT values is used to characterize opacities having a large variation in CT values due to the mixture of light and dark areas such as honeycombing. The air density component is quantified for detection of some opacities, including air in the lungs.

Although the measures obtained from the gray-level distribution are useful for characterization of some diffuse lung diseases, it is difficult to detect nodular and reticular opacities because the gray level distribution does not include information on the shape of opacities. Thus, geometric measures may be employed for characterization of some aspects of the nodular components, line components, and multi-locular components.

In order to detect nodular components, a morphological "white" top-hat transform [12] is applied to an original CT image. The morphological white top-hat transform is defined by the subtraction of the opening of an original image from the original image; this operation corresponds to extracting "white" patterns smaller than the structure element used. If a structure element is a predetermined square (e.g., 7×7), nodular opacities can be extracted while large vessels are removed. In order to remove small noise components in the background, a gray-level thresholding technique may be applied to the morphological white top-hat-transformed image by use of a threshold level of a predetermined number of pixel values which are selected empirically (e.g., 175).

The degree of circularity of a candidate nodule is defined by the fraction of the overlap area of the candidate with the circle having the same area as the candidate. This may be determined for all detected components to distinguish between nodular components and other linear components.

Contrast may be defined by the mean value of the five largest pixel values for each candidate in the white top-hat-transformed image. All detected components with a degree of circularity greater than a predetermined value (e.g., 0.70) may be considered to be initial candidates for nodular components.

Figure 4:
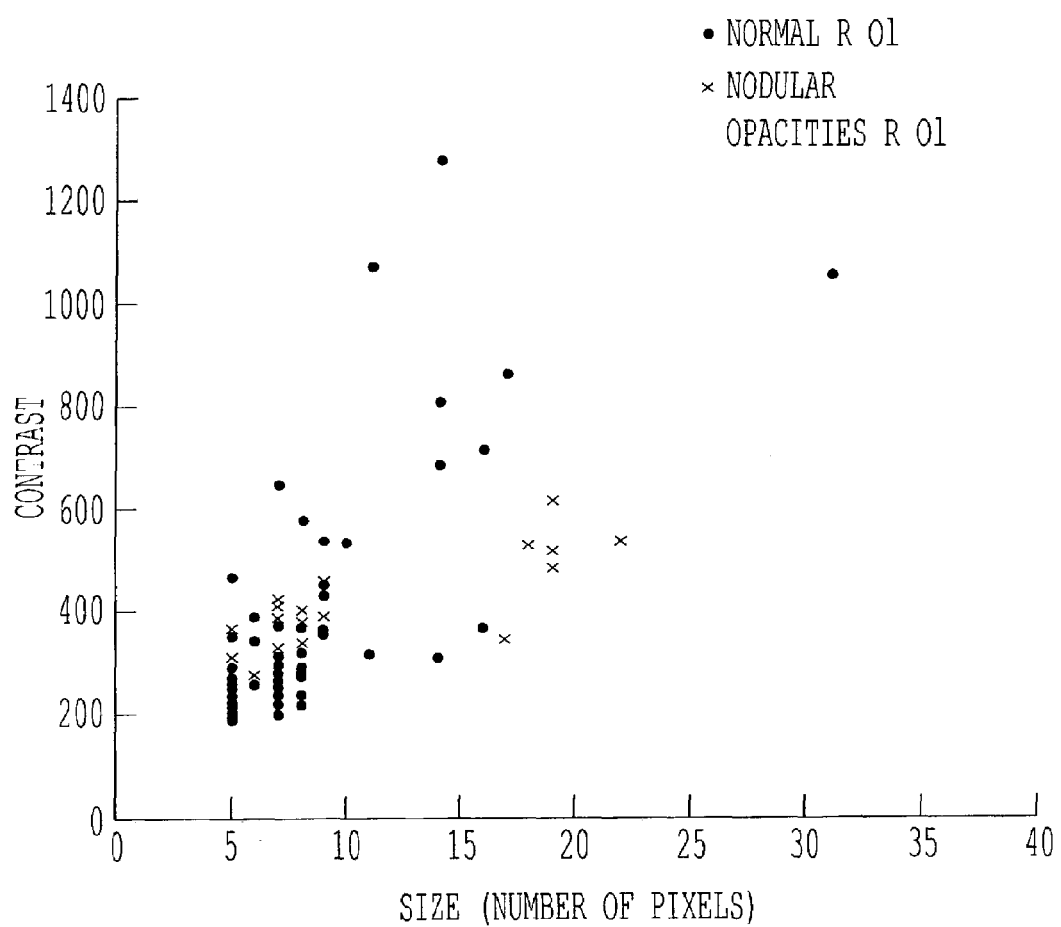
FIG. 4 is a scatter-gram of the relationship between the size and contrast of initial candidates for nodular components in two ROIs selected for normal opacities and nodular opacities.

FIG. 4 is a scatter-gram showing the relationship between the size and contrast of initial candidates for nodular components in two ROIs selected for normal opacities and nodular opacities. The initial candidates for the nodular component with contrast above a predetermined value (e.g., 700) were removed as small circular blood vessels because small blood vessels in a direction perpendicular to the slice tend to produce high contrast and circular patterns. Finally, the average pixel value of the corresponding image may be defined as a measure indicating the fraction of nodular components in each ROI.

Line components may be determined for extraction of the reticular and linear opacities. A gray-level thresholding technique may be applied to the morphological white top-hat-transformed image of an original image by use of a predetermined threshold level of pixel values which may be determined empirically (e.g., 175). The degree of circularity may be determined for all detected components to distinguish between line components and nodular components. All detected components with a degree of circularity less than a predetermined value (e.g., 0.70) may be considered to be initial candidates for line components. A contrast may then be calculated for all of the candidates to distinguish between line components and medium-size vessels.

Figure 5:
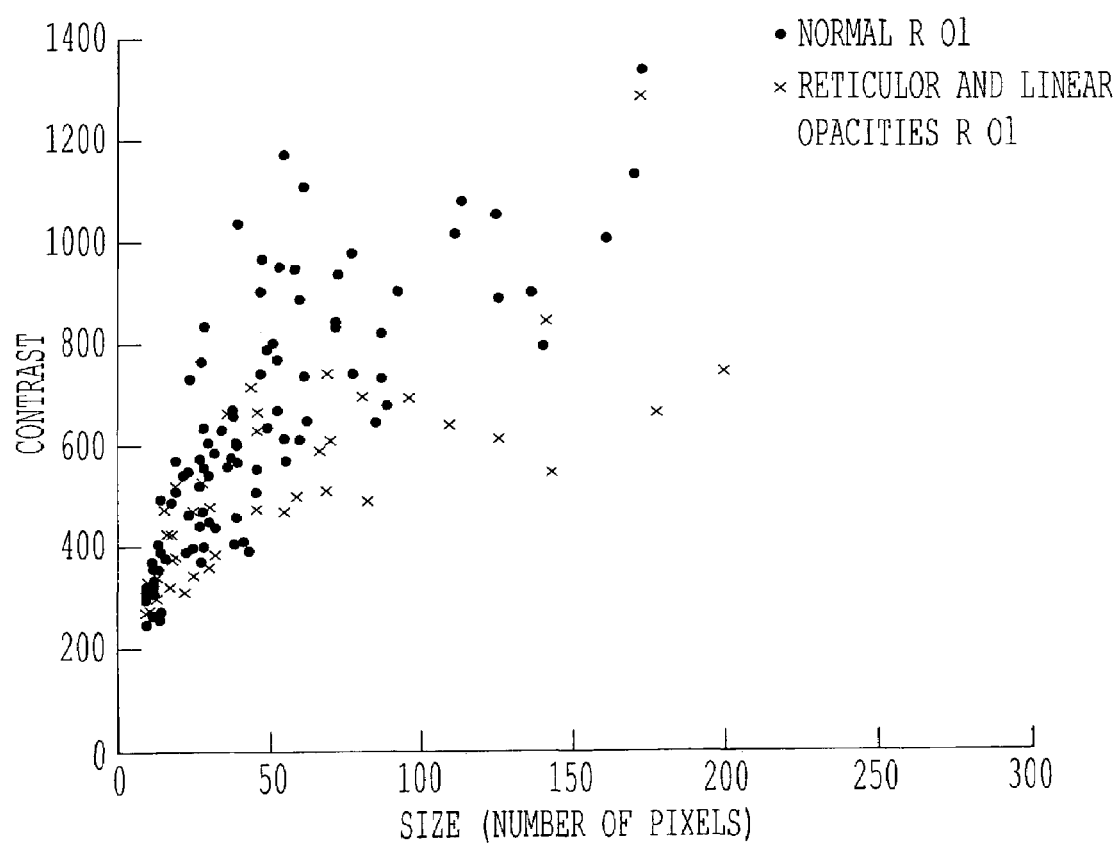
FIG. 5 is a scatter-gram of the relationship between the size and contrast of initial candidates for line components in two ROIs selected for normal opacities, reticular opacities, and linear opacities.

FIG. 5 is a scatter-gram showing the relationship between the size and contrast of initial candidates for line components in two ROIs selected for normal patterns and reticular and linear opacities. The initial candidates for the line component with contrast above a predetermined value (e.g., 700) may be removed as medium-size horizontal blood vessels because medium-size blood vessels in a direction parallel to the slice tend to provide large contrasts. The average pixel value of the resulting image may then be used as a measure for the fraction of line components in each ROI.

A measure for multi-locular patterns may be defined by the average pixel value of the image derived from the morphological "black" top-hat transform. The morphological black top-hat transform is given by subtraction of the original image from the opening of the original image. This operation corresponds to extracting "black" patterns that can fit into the area of the structure element used. The structure element is predefined (e.g., a 7×7 square) so that honeycombing can be detected. Although the standard deviation of the CT value is useful for detecting honeycombing, it is difficult to distinguish between honeycombing and very large vessels. Therefore, the measure for multi-locular patterns is an optional feature.

A three-layered ANN with a back-propagation algorithm [3-15] may be employed as a classifier in the present invention. This ANN may be applied to classify all ROIs in the segmented lung regions into a predetermined number of different pattern categories (e.g., seven including one normal pattern and six different abnormal patterns.) The numbers of input, hidden, and output units are predetermined (e.g., 12, 10, and 7, respectively) with the number of hidden units determined empirically.

The input data for the ANN consists of the features obtained from a small ROI (e.g., with a 32×32 matrix) and the features obtained from a large ROI (e.g., with a 96×96 matrix.) The features for large ROIs are used to take into account the information adjacent to the small ROIs.

The features are normalized by use of the average value and the standard deviation of each feature obtained from all normal ROIs in the database. In the feature space, therefore, the distribution of all features for normal ROIs is centered on the origin, whereas the distribution of features for abnormal ROIs is generally shifted from the origin. The output values for each of the output units obtained with the ANN indicate the likelihood of each of the normal and abnormal patterns. The output unit yielding the largest value is considered to be the result of classification.

In order to distinguish the performance of the classification between normal ROIs and abnormal ROIs in the database, it is possible to use the ROIs obtained from the reference set for training of the ANN.

In order to distinguish the performance of the classification between normal slices and abnormal slices, it is possible to use all normal slices and all abnormal slices in the database as the testing data set. A normal slice is defined as a slice in which none of the radiologists identified any abnormal ROI, whereas an abnormal slice corresponded to a slice in which the radiologists identified at least one identical ROI as abnormal.

Figure 6:
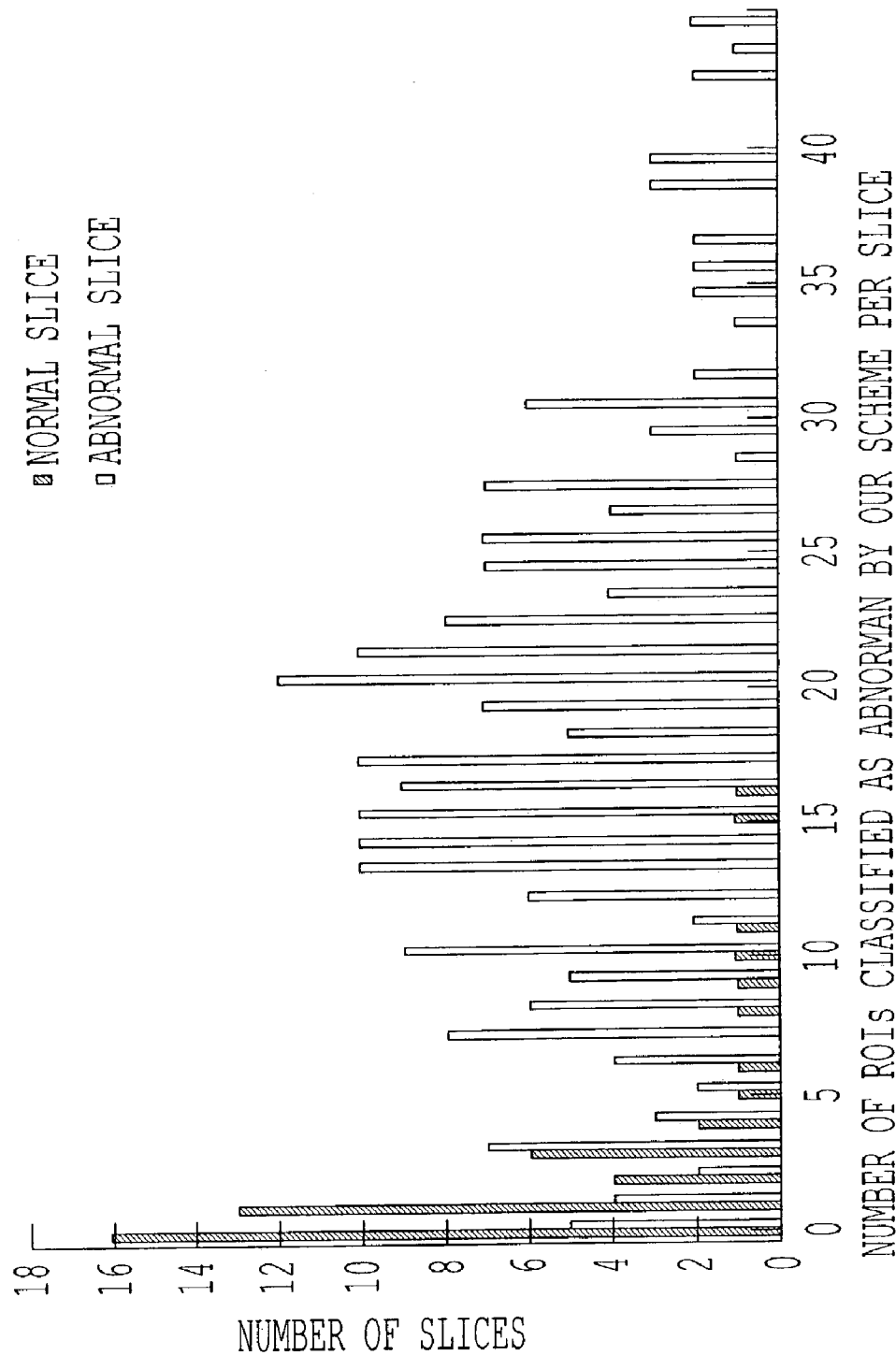
FIG. 6 is a bar chart of the distribution of the numbers of ROIs which were classified as abnormal by the ROI-based classification scheme of the present invention relative to normal slices and abnormal slices.

FIG. 6 shows the distributions of the number of ROIs that were classified as abnormal by the ROI-based classification scheme for both normal and abnormal slices. Many normal slices include a relatively small number of incorrectly identified "abnormal ROIs," which, in conventional systems, would correspond to a false-positive ROI. To reduce false-positive ROIs, one embodiment of the present invention includes a threshold feature where a slice with more than a predetermined number (e.g., five) computer-identified abnormal ROIs is considered as an abnormal slice and a slice where the number of ROIs is less than the predetermined number is further evaluated for contiguousness or other features.

To test an embodiment of the present invention, the inventors investigated the usefulness of the previously identified six abnormal opacity features from a reference set of slices derived from an existing clinical database. In this test, clinical cases were selected from HRCT images in the Department of Radiology at the University of Chicago Hospitals based on normal cases and abnormal cases reported in clinical examinations from 1998 to 2002. The image database included 315HRCT images selected from 105 patients, which were obtained with three CT systems (a HiSpeed CT/i, a LightSpeed QX/i, and a GENESIS HISPEED/RP; GE Medical Systems, Milwaukee, Wis.). The image matrix size was 512×512 pixels, and the gray-level resolution was 12 bits. The slice thickness ranged from 1.0 mm to 3.0 mm. The X-ray tube voltages were 120 kVp and 140 kVp. The field of view was optimized for each patient during the examination, so that the pixel size in the database ranged from 0.494 mm to 0.781 mm.

Figure 7A:
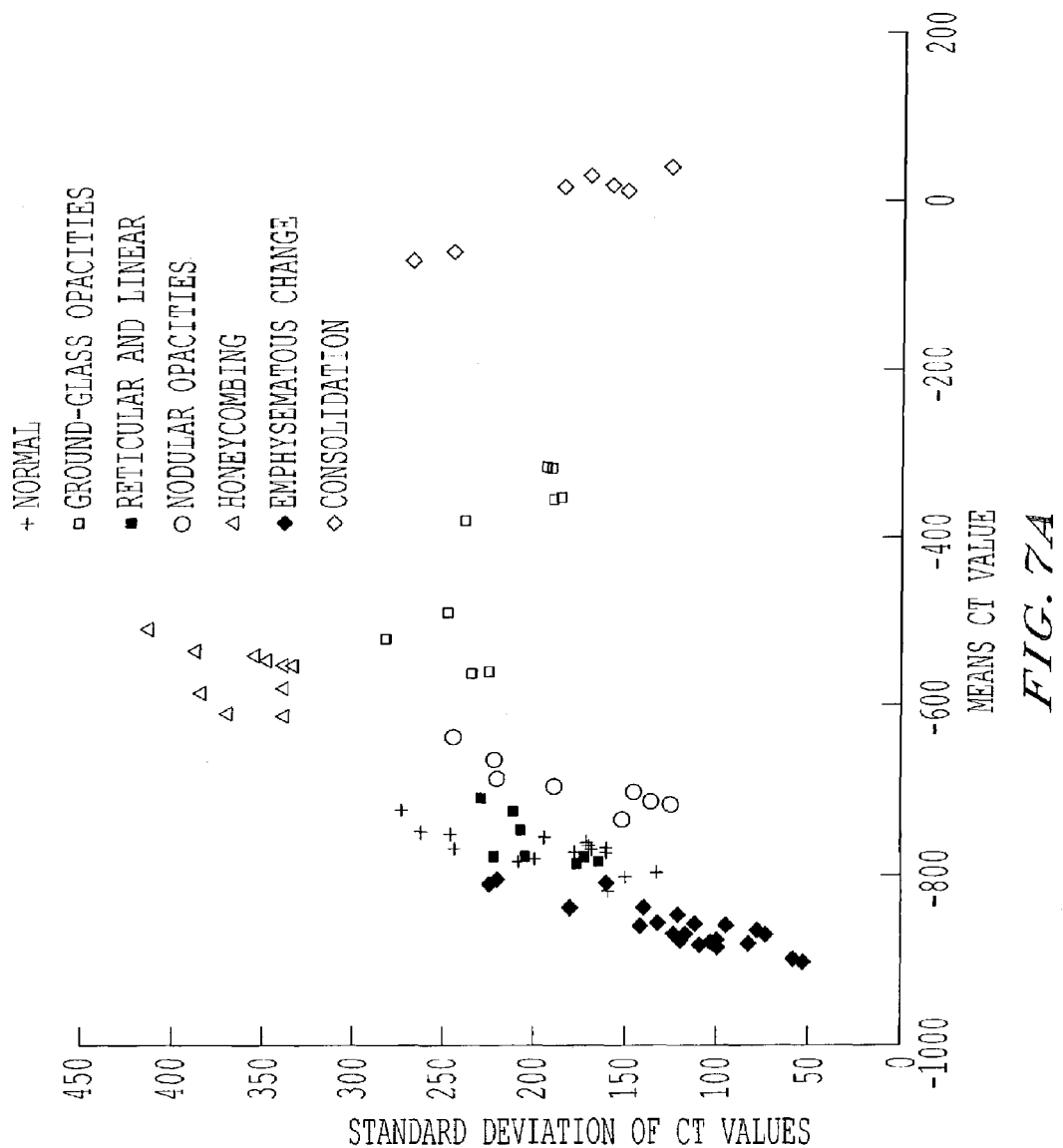
FIGS. 7a-7e are scatter-grams of the physical measures for ROIs selected from the seven slices illustrated in FIG. 1.

In the test, the present inventors selected several ROIs from seven slices as illustrated in FIG. 1. FIG. 7(a) shows the relationship between the mean and the standard deviation of CT values associated with these slices. Some of the abnormal patterns in FIG. 7(a) were determined to have distinctive features and thus could be distinguished from other opacities, even if only two features were employed. For example, the mean CT values for consolidation were larger than others, whereas the mean CT values for emphysematous change were smaller than others. The standard deviation of CT values for honeycombing was much larger than that for all of the other categories. The ground-glass pattern has relatively large CT values comparable to those of honeycombing, but its standard deviation was less than that of honeycombing.

Figure 7B:
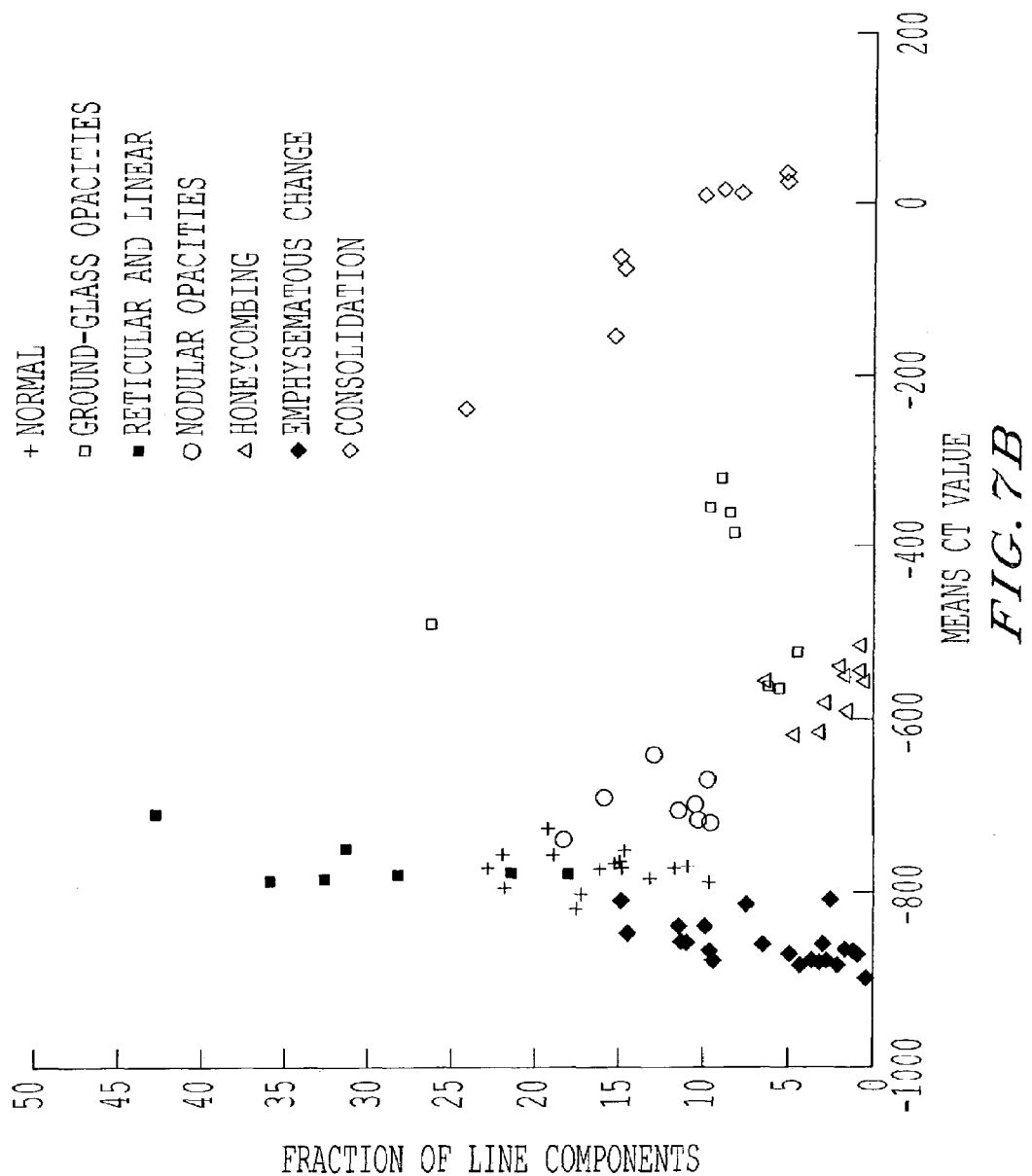

FIG. 7(b) shows the relationship between the fraction of line components and the mean CT value. The fractions of line components for reticular and linear patterns are greater than those of normal patterns and other abnormal patterns.

Figure 7C:
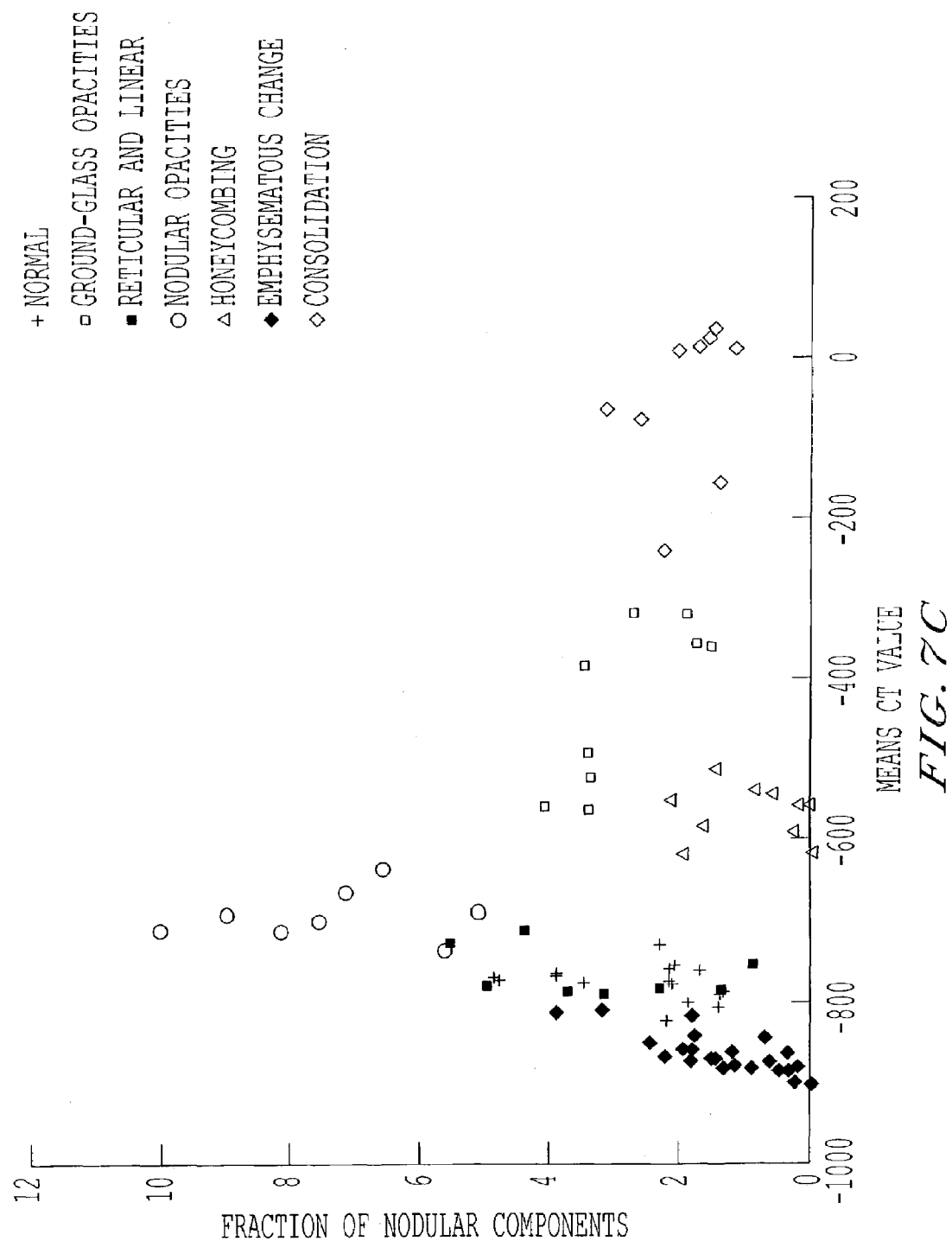
Figure 7D:
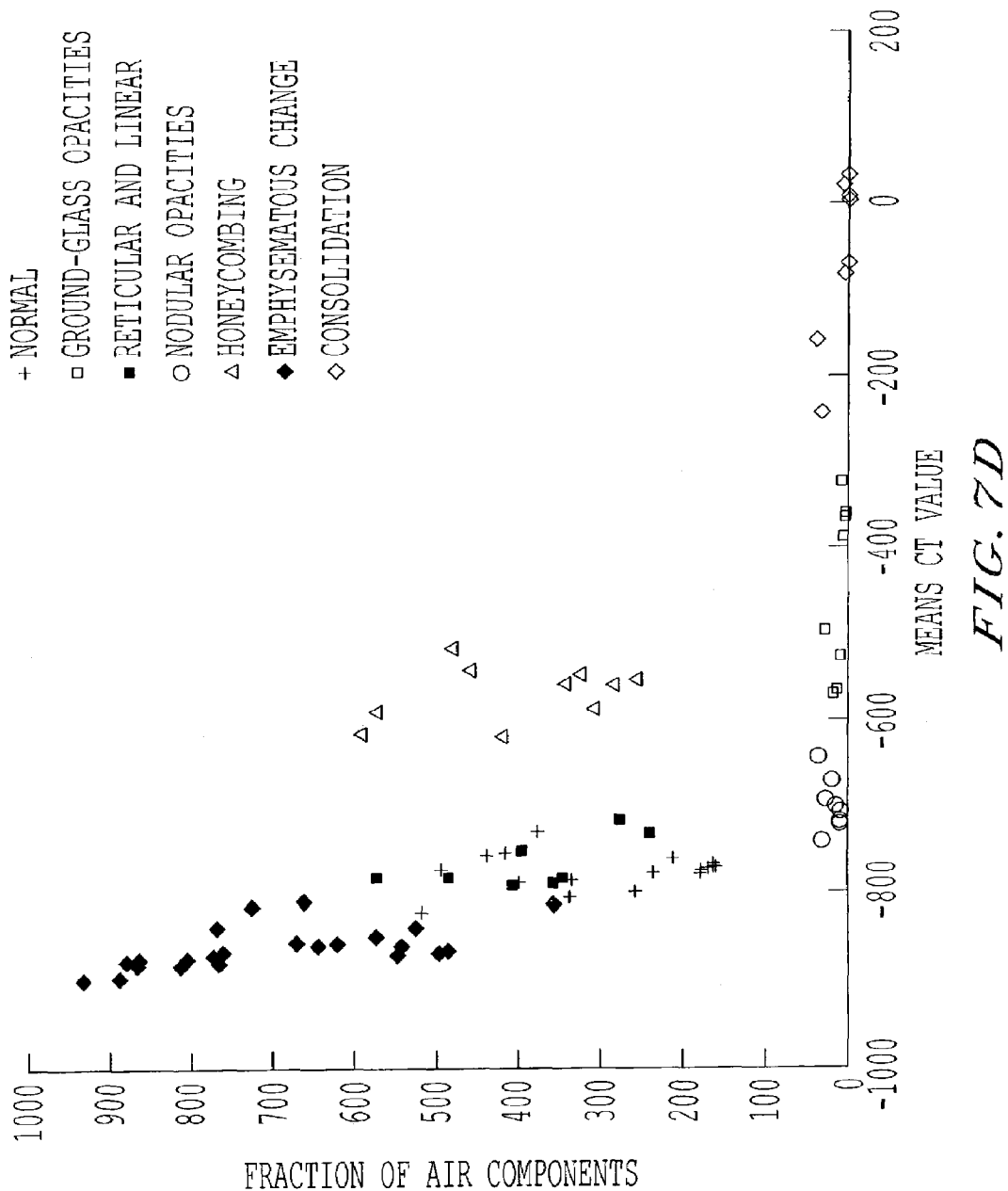
Figure 7E:
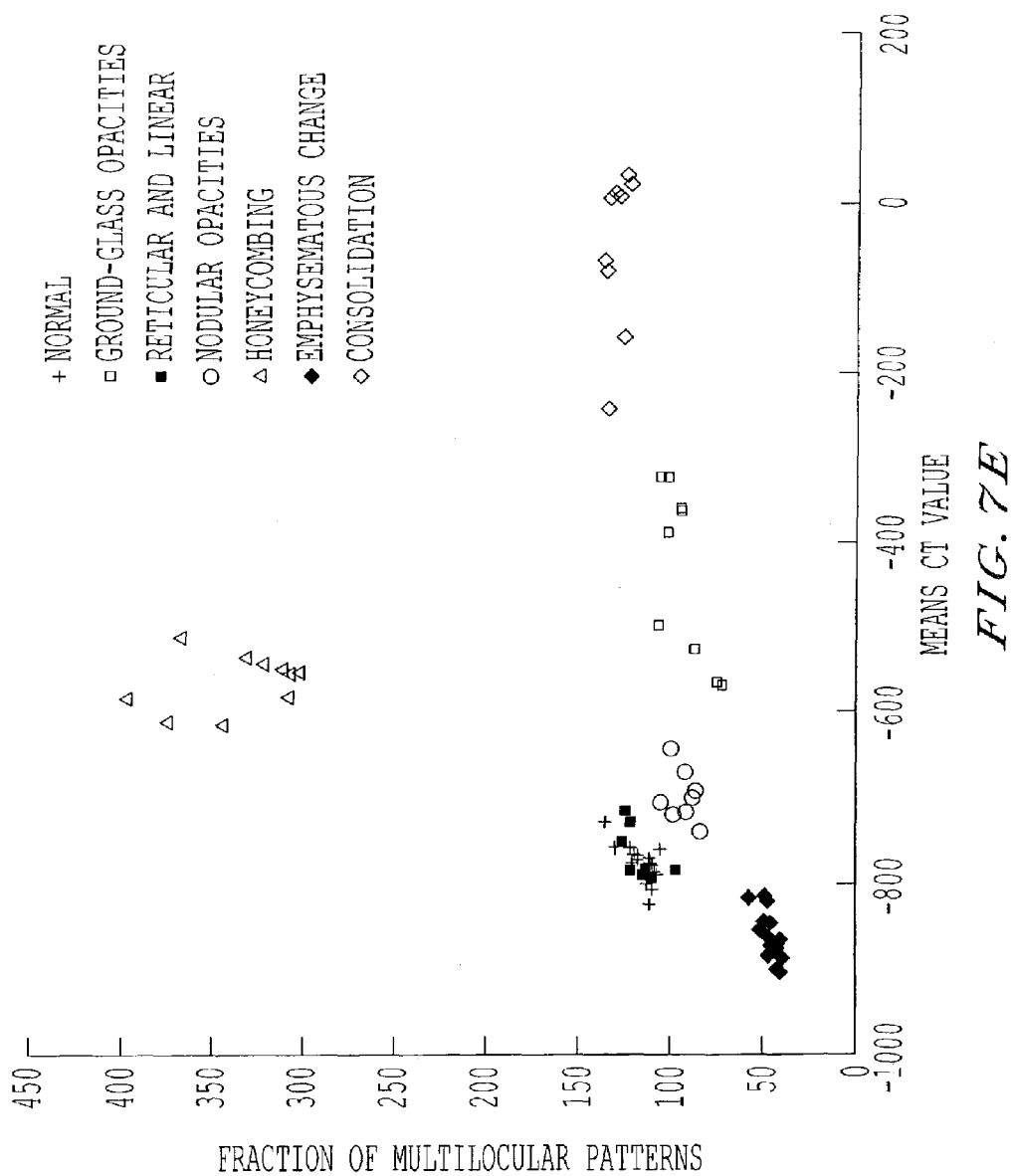

FIG. 7(c) shows the relationship between the fraction of nodular components and the mean CT value. The fractions of nodular components for the nodular pattern are greater than those of normal patterns and other abnormal patterns. FIG. 7(d) shows the relationship between the fraction of air density components and the mean CT value. The ROIs with an emphysema pattern have more pixels with CT values between −910 HU and −1000 HU than do other patterns. FIG. 7(e) shows the relationship between the fraction of multi-locular components and the mean CT value. The ROIs with a honeycomb pattern contain more multi-locular components than do any other patterns.

Figure 8A:
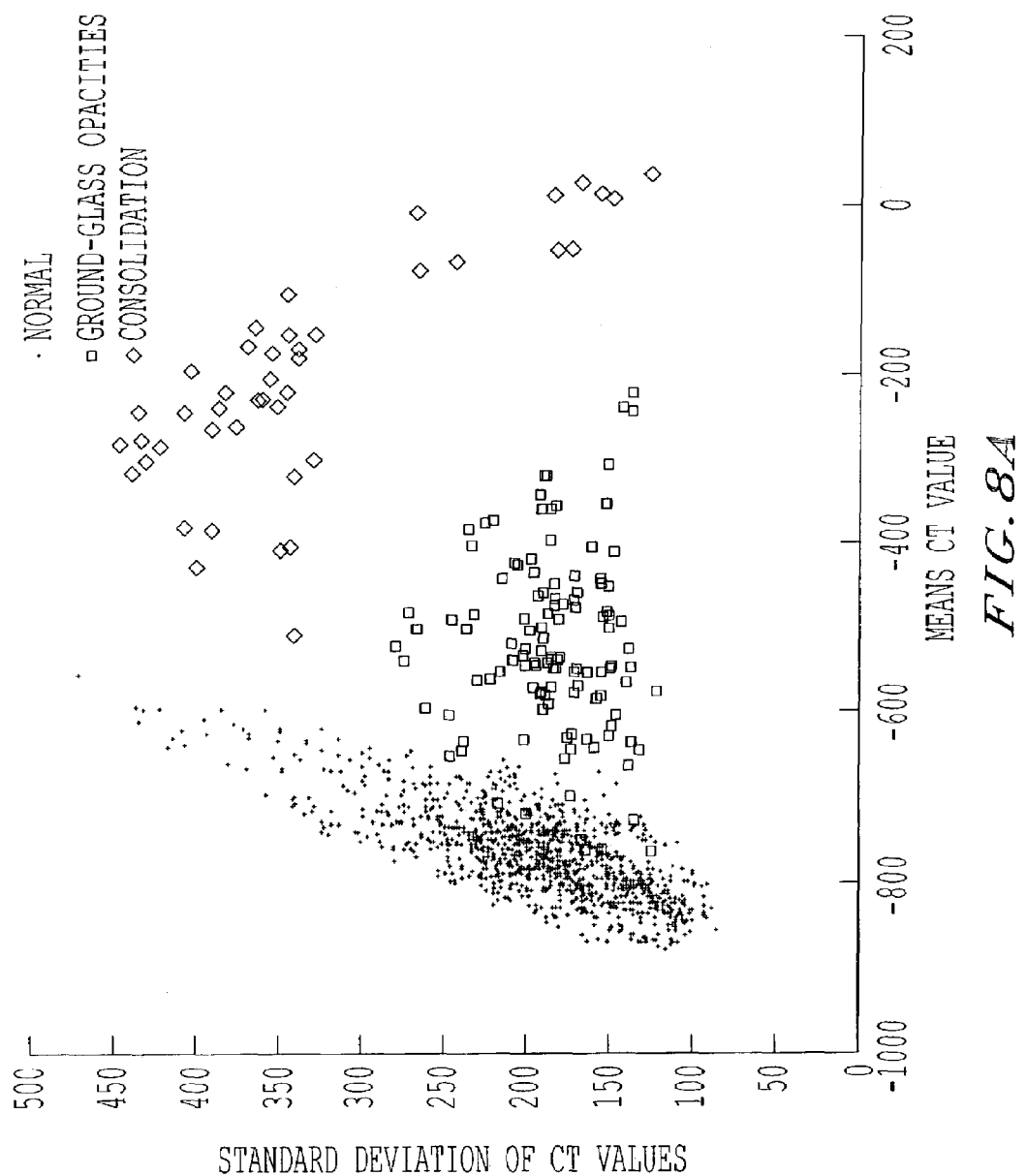
Figure 8B:
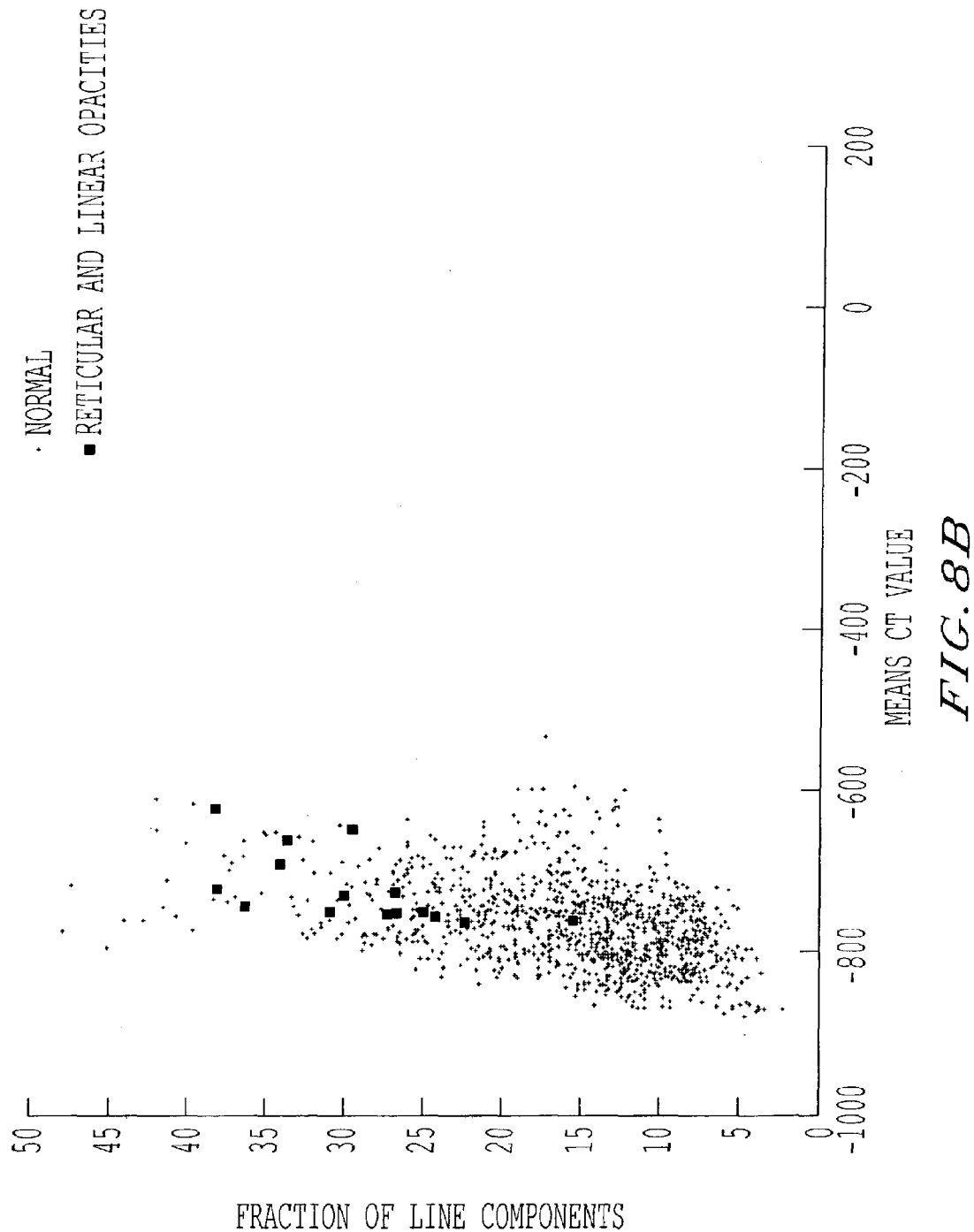
Figure 8D:
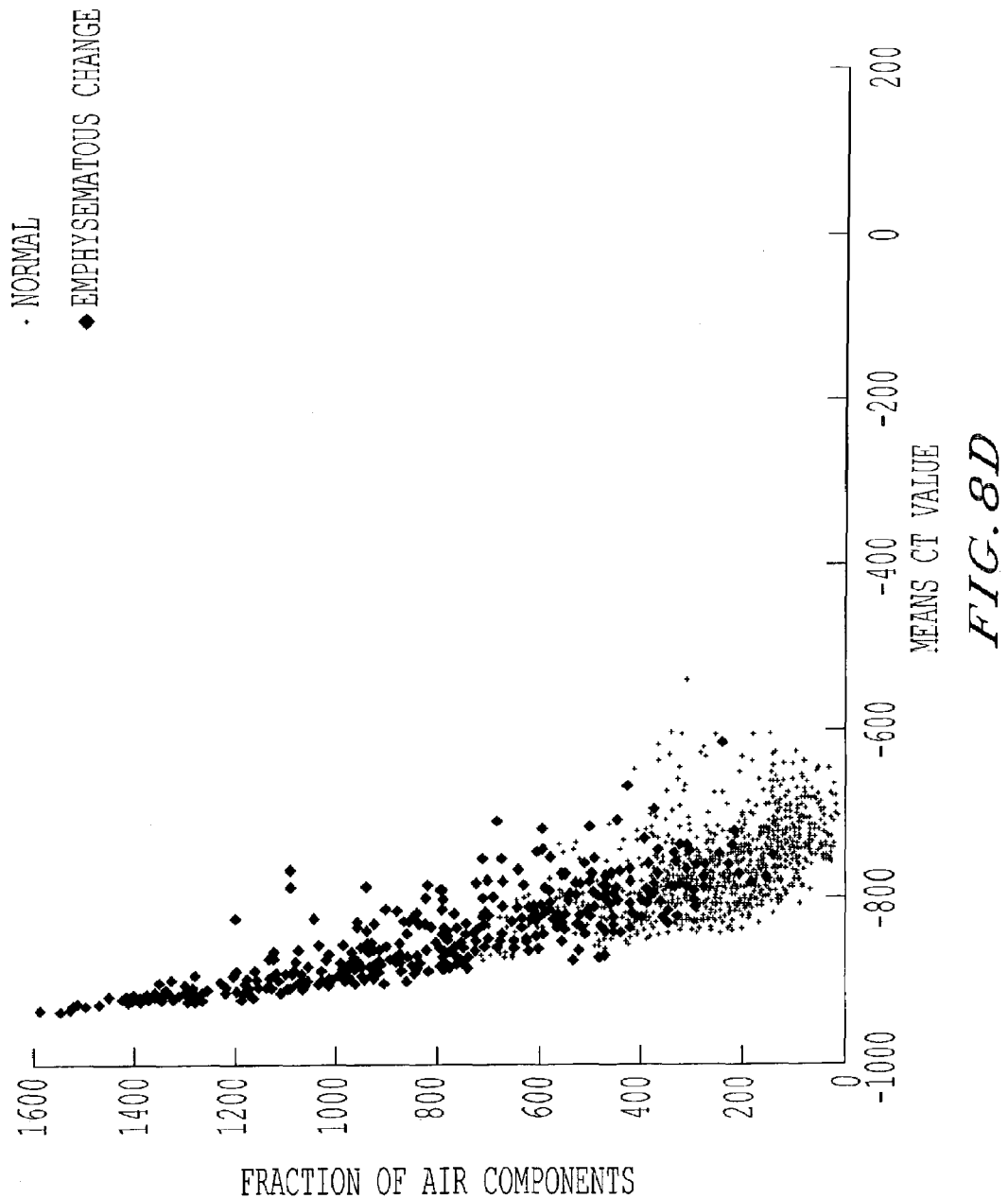
Figure 8E:
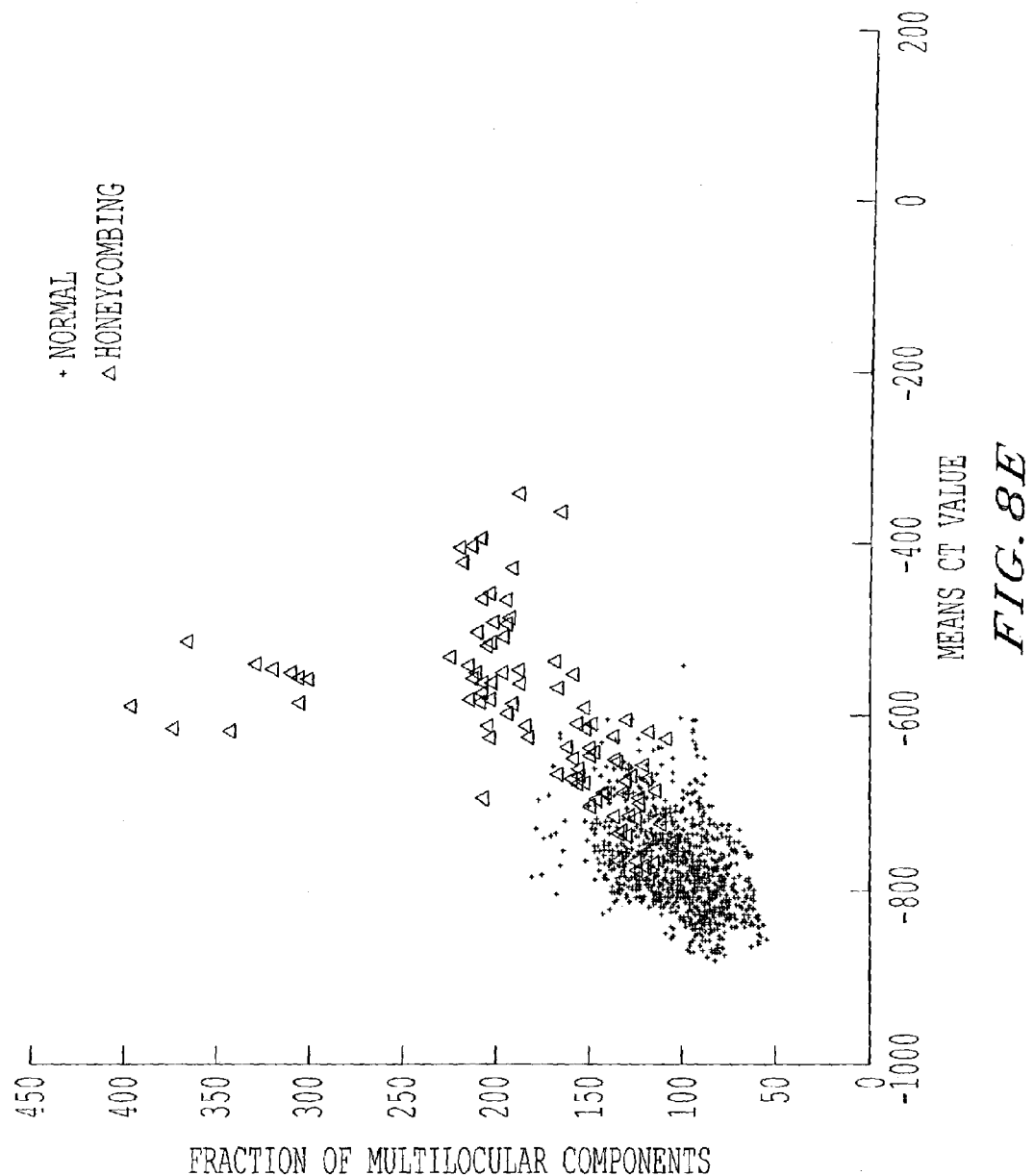

FIG. 8(a) shows the distribution of data points for normal patterns, ground-glass opacities, and consolidations in terms of the mean and the standard deviation of CT values. All consolidations can be distinguished from normal patterns and ground-glass opacities, whereas ground-glass opacities are slightly overlapped with normal patterns. FIG. 8(b) shows the relationship between the line components and the mean CT value for normal patterns and reticular and linear opacities. Although some of the normal patterns have large line components, the distribution for reticular and linear opacities tends to be shifted from that for normal patterns. FIG. 8(c) shows the relationship between the nodular components and the mean CT value for normal patterns and nodular opacities. Although the two distributions for nodular opacities and normal patterns are largely overlapped, some of the nodular opacities can be distinguished from normal patterns by use of the fraction of nodular components. FIG. 8(d) shows the relationship between air density components and the mean CT value for normal patterns and emphysematous change. Most of the emphysematous changes can be distinguished from normal patterns. FIG. 8(e) shows the relationship between the multi-locular components and the mean CT value for normal patterns and honeycombing; most of the honeycombings can be distinguished from normal patterns.

The ANN was trained and tested with reference and diagnostic normal ROIs and abnormal ROIs, respectively. To create the reference set, abnormal ROIs were independently marked by three radiologists as being either an abnormal pattern corresponding to a reference image or as a different abnormal pattern. Normal ROIs and abnormal ROIs identified as corresponding to reference images were extracted and used as the ANN training data set. Once trained with reference data, new images were submitted to the ANN. In the testing, a diagnostic ROI was considered abnormal when the ANN output corresponded to an output equivalent to an output from one of the six reference abnormal patterns, whereas a ROI was considered normal when the output corresponded to an output equivalent to one for a reference normal pattern. For each diagnostic ROI evaluated, twelve independent features were entered as inputs. The ANN was configured to output 0.9 or more for a correct match and 0.1 for an incorrect match.

FIG. 12 shows the results of a consistency test for the training cases used to investigate the performance of the classification between normal and abnormal ROIs. The sensitivity of this computerized method for detection of the six abnormal patterns in each ROI was 99.2% (122/123) for ground-glass opacities, 100% (15/15) for reticular and linear opacities, 88.0% (132/150) for nodular opacities, 100% (98/98) for honeycombing, 95.8% (369/385) for emphysematous change, and 100% (43/43) for consolidation. The specificity in detecting a normal ROI was 88.1% (940/1045). Although the average performance was high, the efficiency for discriminating between normal patterns and a nodular pattern was relatively low, i.e., 6.7% (72/1045) of normal ROIs were classified incorrectly as nodular opacities. This result is probably caused by the fact that there were many nodular-like patterns in normal slices.

TABLE 1

Computerized classification for distinguishing between normal ROIs and abnormal ROIs.

| | Computer Output | |
|---|---|---|
| Cases (Number of ROIs) | Normal | Abnormal |
| Normal ROI (1067) | 940 (88.0%) | 127 (11.9%) |
| Abnormal ROI due to identical patterns (814) | 21 (2.6%) | 793 (97.4%) |
| Abnormal ROI due to different patterns (801) | 119 (14.9%) | 682 (85.1%) |

Table 1 shows the results of the classification performance between normal ROIs and abnormal ROIs. The sensitivity and specificity for detection of abnormal ROIs were 97.4% (793/814) and 88.0% (940/1067), respectively. However, the sensitivity for abnormal ROIs which were identified by the three radiologists as abnormals, but with different opacities, were 85.1% (682/801), which is lower than that (97.4%) for abnormal ROIs that were identified by all radiologists as the same type of opacities. These results seem to indicate that the two distributions for normal and abnormal patterns can be separated in the feature space obtained by use of six physical measures.

TABLE 2

Computerized classification for distinction among normal slices, abnormal slices, and suspicious normal/abnormal slices.

| | Computer Output | |
|---|---|---|
| Cases (Number of ROIs) | Normal | Abnormal |
| Normal slice (49) | 41 (83.7%) | 8 (16.3%) |
| Abnormal slice (213) | 21 (9.9%) | 192 (90.1%) |
| Suspicious normal/abnormal slice (53) | 28 (52.8%) | 25 (47.2%) |

Table 2 shows the classification performance for normal slices, abnormal slices, and suspicious normal/abnormal slices. The normal slices were determined when there was no area identified by any of the three radiologists as abnormal. The abnormal slices were determined when there was an area identified by the three radiologists as abnormal even if they considered them as different abnormal patterns.

The slices that did not belong to normal slices and abnormal slices were determined as "suspicious normal/abnormal slice", i.e., they were determined when there was an area identified by one or two of the radiologists as abnormal. The sensitivity and specificity for detection of abnormal slices were 90.1% (192/213) and 83.7% (41/49), respectively. However, 52.8% (28/53) of the suspicious normal/abnormal slices were classified as normal slices, whereas 47.2% (25/53) of the suspicious normal/abnormal slices were classified as abnormal slices.

Figure 9A:
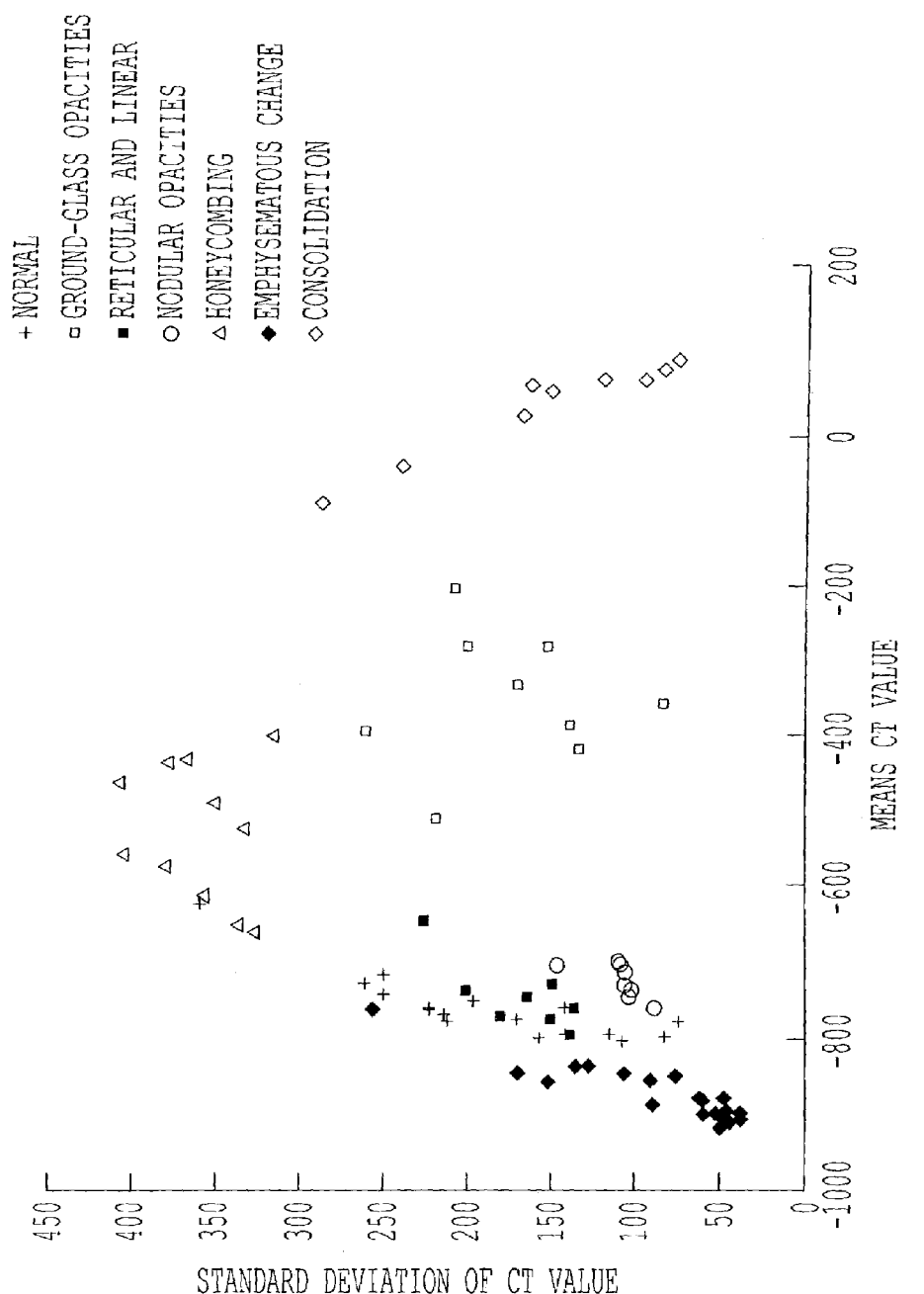
FIGS. 9a-9b are scatter-grams of the distributions of physical measures obtained from small ROIs (32×32 pixels) and large ROIs (96×96 pixels), respectively.
Figure 9B:
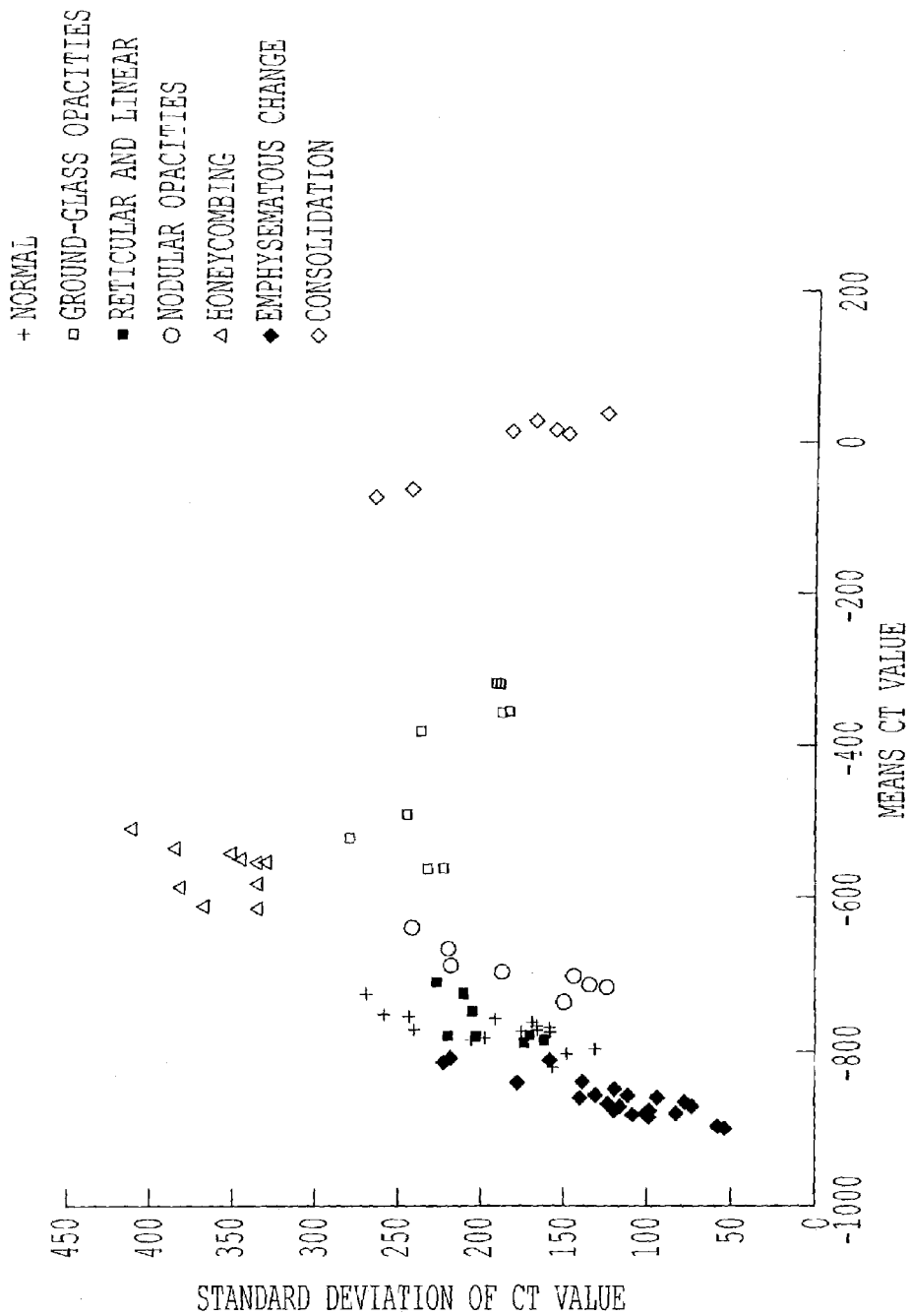

FIG. 9 shows the effect of ROI size on the physical measures. As the ROI size increased from 32×32 to 96×96, the distribution of data points for each of the different abnormal patterns was separated slightly. This is probably because large ROIs tended to give a better estimate of the statistical properties of physical measures than did small ROIs. However, ROIs of 32×32 pixels (16×16 mm) may be useful for capturing localized distinctive features of diffuse lung disease in small areas. In fact, it appears to be useful to employ the combination of small and large ROIs to distinguish between some of the abnormal patterns and normal patterns, as demonstrated below.

Figure 10:
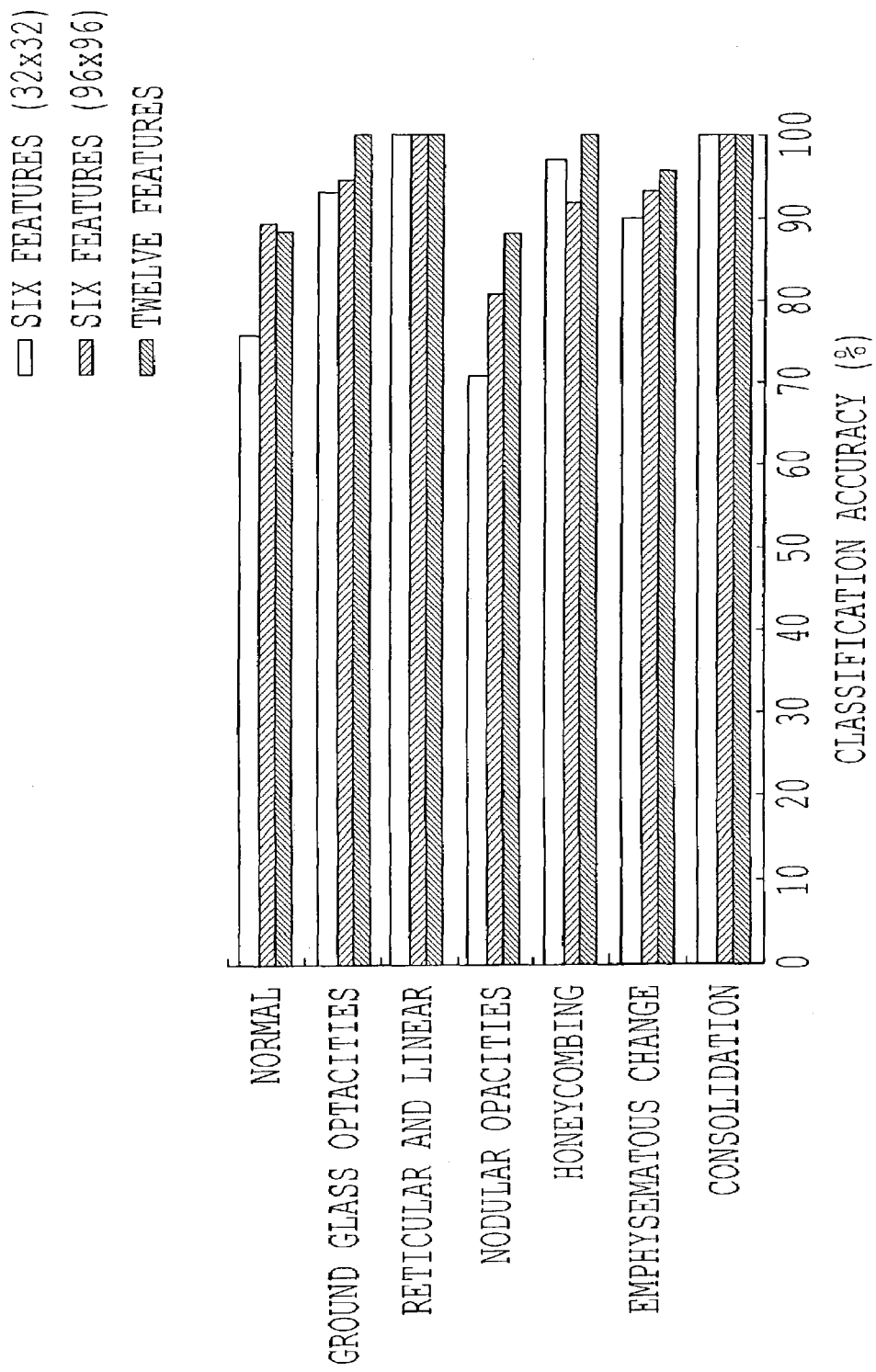
FIG. 10 is a bar chart of the classification accuracy of one embodiment of the present invention using an ANN obtained with six input features and twelve input features.

FIG. 10 shows the classification performance of the ANN with six features from small ROIs, and with six features from large ROIs, and with twelve features from small and large ROIs. As shown in FIG. 10, the ANN with twelve features provided a better classification performance for all of the abnormal categories than did the ANN with six features.

Figure 11:
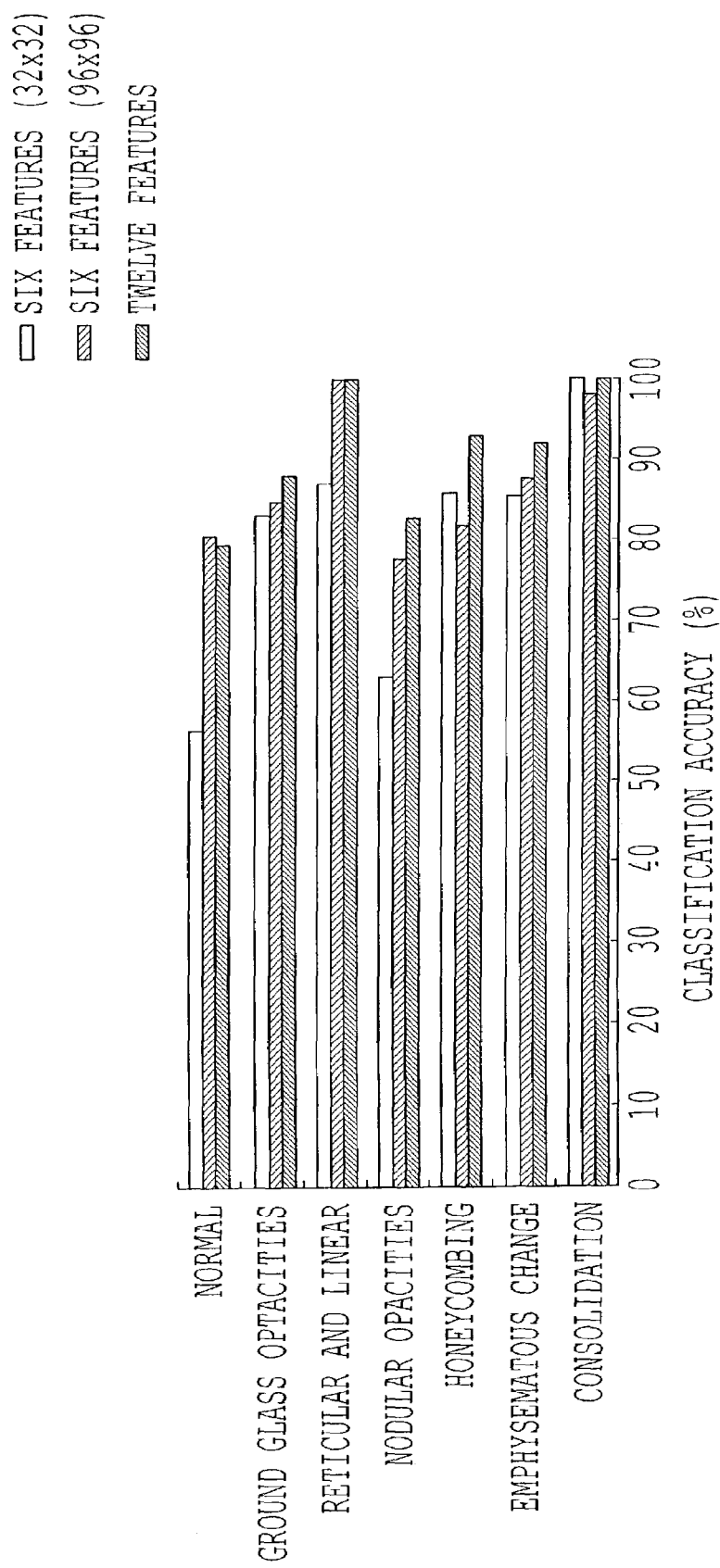
FIG. 11 is a bar chart of the classification accuracy of the Bayesian classifier of one embodiment of the present invention using an ANN obtained with six input features and twelve input features.

FIG. 11 shows the classification performances of the Bayesian classifier [6,17] with six features from small ROIs, with six features from large ROIs, and with twelve features from small and large ROIs. The Bayesian classifier with twelve features also provided a better overall classification performance than did the Bayesian classifier with six features, although the overall classification performance by the Bayesian classifier was lower than that by the ANN. This result seems to indicate that it would be useful to take into account the information for both small and large ROIs.

For the size of large ROIs, testing confirmed that the matrix size of 64×64 did not provide a better performance than did the 96×96 matrix.

In testing one embodiment of the present invention, six physical measures were determined for detection and characterization of diffuse lung diseases in HRCT images. The results indicated the usefulness of the six physical measures for distinction between normal patterns and six different types of diffuse lung diseases. This computerized method may be useful in assisting radiologists in their assessment of diffuse lung disease in HRCT images using larger or smaller sets of physical measures in alternative embodiments.

Embodiments described previously address 2D CT imaging directed to one of the axial, sagittal, or coronal plane. These images may be, for example, slices derived from a complete 3D CT or MRI image. However, an alternative embodiment directed to analysis of 3D images is also possible. In the 3D embodiment, previously described gray-level features are obtained and analyzed as in the 2D embodiment. The geometric features used are 3D analogs to those in the 2D embodiments (e.g., degree of sphericity instead of degree of circularity and volume of interest (VOI) instead of ROI). Thus, in the 3D embodiment of the present invention, reference and diagnostic image data are compared over a volume rather than a surface.

All embodiments of the present invention conveniently may be implemented using a conventional general purpose computer or micro-processor programmed according to the teachings of the present invention, as will be apparent to those skilled in the computer art. Appropriate software may readily be prepared by programmers of ordinary skill based on the teachings of the present disclosure, as will be apparent to those skilled in the software art.

As disclosed in cross-referenced U.S. patent application Ser. No. 09/773,636, a computer 900 may implement the methods of the present invention, wherein the computer housing houses a motherboard which contains a CPU, memory (e.g., DRAM, ROM, EPROM, EEPROM, SRAM, SDRAM, and Flash RAM), and other optional special purpose logic devices (e.g., ASICS) or configurable logic devices (e.g., GAL and reprogrammable FPGA). The computer also includes plural input devices, (e.g., keyboard and mouse), and a display card for controlling a monitor. Additionally, the computer may include a floppy disk drive; other removable media devices (e.g. compact disc, tape, and removable magneto-optical media); and a hard disk or other fixed high density media drives, connected using an appropriate device bus (e.g., a SCSI bus, an Enhanced IDE bus, or an Ultra DMA bus). The computer may also include a compact disc reader, a compact disc reader/writer unit, or a compact disc jukebox, which may be connected to the same device bus or to another device bus.

Examples of computer readable media associated with the present invention include compact discs, hard disks, floppy disks, tape, magneto-optical disks, PROMs (e.g., EPROM, EEPROM, Flash EPROM), DRAM, SRAM, SDRAM, etc. Stored on any one or on a combination of these computer readable media, the present invention includes software for controlling both the hardware of the computer and for enabling the computer to interact with a human user. Such software may include, but is not limited to, device drivers, operating systems and user applications, such as development tools. Computer program products of the present invention include any computer readable medium which stores computer program instructions (e.g., computer code devices) which when executed by a computer causes the computer to perform the method of the present invention. The computer code devices of the present invention may be any interpretable or executable code mechanism, including but not limited to, scripts, interpreters, dynamic link libraries, Java classes, and complete executable programs. Moreover, parts of the processing of the present invention may be distributed (e.g., between (1) multiple CPUs or (2) at least one CPU and at least one configurable logic device) for better performance, reliability, and/or cost. For example, an outline or image may be selected on a first computer and sent to a second computer for remote diagnosis.

The present invention may also be complemented with additional filtering techniques and tools to account for image contrast, degree of irregularity, texture features, etc.

The invention may also be implemented by the preparation of application specific integrated circuits or by interconnecting an appropriate network of conventional component circuits, as will be readily apparent to those skilled in the art.

The source of image data to the present invention may be any appropriate image acquisition device such as an X-ray machine, CT apparatus, and MRI apparatus. Further, the acquired data may be digitized if not already in digital form. Alternatively, the source of image data being obtained and processed may be a memory storing data produced by an image acquisition device, and the memory may be local or remote, in which case a data communication network, such as PACS (Picture Archiving Computer System), may be used to access the image data for processing according to the present invention.

Numerous modifications and variations of the present invention are possible in light of the above technique. For example, the present invention may also be adapted to images of organs and/or diseases other than the lung and lung diseases disclosed above. It is therefore to be understood that within the scope of the appended claims, the invention may be practiced otherwise than as specifically described herein.

The invention claimed is:

1. A method for detecting the presence of an abnormality in at least one medical image, comprising:
   obtaining image data including pixels of an organ;
   segmenting the image data into organ image data and non-organ image data;
   extracting predetermined features from said organ image data to produce a set of image features;

comparing said set of image features with a reference set of organ image features derived from known abnormal image data and known normal image data; and producing a comparison result, wherein said comparing said set of image features comprises comparing with reference organ features selected from the set consisting of:
a normal opacity;
a ground-glass opacity;
a reticular/linear opacity;
a nodular opacity;
a honeycombing pattern;
an emphysematous change pattern; and
a consolidation pattern.

2. The method of claim 1, wherein said obtaining image data comprises:
obtaining lung image data.

3. The method of claim 1, wherein said obtaining image data comprises:
obtaining a high-resolution (HR) computed tomography (CT) image.

4. The method of claim 1, wherein said comparing step comprises:
comparing with an artificial neural network (ANN).

5. The method of claim 1, wherein said comparing step comprises:
comparing with a Bayesian classifier.

6. The method of claim 1, wherein said comparing said set of image features comprises comparing with reference organ features selected from the set consisting of:
a non-specific diffuse opacity; and
an abnormality including each of
atelectasis,
pleural thickening,
bronchectasis,
pleural effusion,
bulla,
a focal lung lesion, and
an artifact.

7. The method of claim 1, wherein said extracting step comprises:
determining at least one measure of gray-level distribution of pixel values in one of a 2D region of interest (ROI) and a 3D volume of interest (VOI); and
determining at least one geometric feature.

8. The method of claim 7, wherein said determining at least one measure of gray-level distribution comprises:
determining at least one of a mean, a standard deviation, and a fraction of an area with air density components.

9. The method of claim 7, wherein said determining at least one measure of gray-level distribution comprises:
determining each of a mean, a standard deviation, and a fraction of an area with air density components.

10. The method of claim 8, wherein said determining a fraction of an area with air density components comprises:
determining an area having CT values between −910 and −1000 HU, inclusively.

11. The method of claim 7, wherein said determining at least one geometric feature comprises:
determining at least one of a nodular geometric feature, a line geometric feature, and a multi-locular geometric feature.

12. The method of claim 7, wherein said determining at least one geometric feature comprises:
determining each of a nodular geometric feature, a line geometric feature, and a multi-locular geometric feature.

13. The method of claim 11, wherein said determining a nodular geometric feature comprises:
applying a morphological white top-hat transform to the one of a 2D ROI and a 3D VOI to produce a nodule candidate; and
calculating one of a degree of circularity and a degree of sphericity of said nodule candidate to produce a nodule candidate.

14. The method of claim 11, wherein said determining a line geometric feature comprises:
applying a morphological white top-hat transform to said one of a 2D ROI and a 3D VOI to produce a nodule candidate;
calculating one of a degree of circularity and a degree of sphericity to said nodule candidate to produce a nodule estimate; and
applying a gray-level threshold to said nodule estimate to produce a thresholded nodule estimate.

15. The method of claim 11, wherein said determining a multi-locular geometric feature comprises:
applying a morphological black top-hat transform to the one of a 2D ROI and a 3D VOI to produce a nodule candidate; and
calculating a standard deviation of said nodule candidate.

16. The method of claim 7, wherein said determining at least one measure comprises:
determining a measure of gray-level distribution for a first 2D ROI; and
determining a measure of gray-level distribution for a second 2D ROI, said second 2D ROI selectively set to be larger than said first 2D ROI.

17. The method of claim 7, wherein said determining at least one measure comprises:
determining a measure of gray-level distribution for a first 3D VOI; and
determining a measure of gray-level distribution for a second 3D VOI, said second 3D VOI selectively set to be larger than said first 3D VOI.

18. The method of claim 7, wherein said 2D region of interest (ROI) comprises:
determining a measure of gray-level distribution for a 16×16 mm ROI; and
determining a measure of gray-level distribution for a 48×48 mm ROI.

19. The method of claim 4, wherein said comparing with an ANN comprises:
comparing with an ANN having
12 input units,
10 hidden units, and
7 output units.

20. The method of claim 7, wherein said pixel values comprise CT values.

21. The method of claim 1, wherein said extracting step comprises:
determining at least one feature from a gray-level distribution of pixel values one of in a 2D region of interest (ROI) and a 3D volume of interest (VOI).

22. The method of claim 21, wherein said determining step comprises:
determining a measure of gray-level distribution for a first 2D ROI; and
determining a measure of gray-level distribution for a second 2D ROI, said second 2D ROI selectively set to be larger than said first 2D ROI.

23. The method of claim 21, wherein said determining step comprises:

determining a measure of gray-level distribution for a first 3D VOI; and determining a measure of gray-level distribution for a second 3D VOI, said second 3D VOI selectively set to be larger than said first 3D VOL.

24. The method of claim 1, wherein said obtaining step comprises:

obtaining 2D data including data derived from one of an axial plane, a sagittal plane, and a coronal plane.

25. The method of claim 1, wherein said obtaining step comprises:

obtaining 3D data including data derived from an axial plane, a sagittal plane, and a coronal plane.

26. A method for detecting the presence of an abnormality in at least one medical image, comprising:

obtaining image data including pixels of an organ;

segmenting the image data into organ image data and non-organ image data;

extracting predetermined features from said organ image data to produce a set of image features;

comparing said set of image features with a reference set of organ image features derived from known abnormal image data and known normal image data; and producing a comparison result, wherein said comparing said set of image features comprises comparing with each of:

a normal opacity;
a ground-glass opacity;
a reticular/linear opacity;
a nodular opacity;
a honeycombing pattern;
an emphysematous change pattern; and
a consolidation pattern.

27. The method of claim 26, wherein said comparing said set of image features comprises comparing with each of:

a non-specific diffuse opacity; and
atelectasis;
pleural thickening;
bronchectasis;
pleural effusion;
bulla;
a focal lung lesion; and
an artifact.

28. A system for implementing the method recited in any one of claims 1-27.

29. A computer readable medium storing instructions for execution on a computer system, which when executed by the computer system, causes performance of the method recited in any one of claims 1-27.

* * * * *